United States Patent
Zhang et al.

(10) Patent No.: US 11,597,736 B2
(45) Date of Patent: Mar. 7, 2023

(54) LITHIUM BORON FLUOROPHOSPHATE COMPLEX COMPOUND, LITHIUM BORON FLUOROPHOSPHATE-CONTAINING COMPOSITION, LITHIUM BORON FLUOROPHOSPHATE, ADDITIVE FOR LITHIUM SECONDARY BATTERY, NON-AQUEOUS ELECTROLYTIC SOLUTION FOR BATTERY, AND LITHIUM SECONDARY BATTERY

(71) Applicant: MITSUI CHEMICALS, INC., Tokyo (JP)

(72) Inventors: Han Zhang, Ichihara (JP); Yusuke Shimizu, Ichihara (JP); Kenichi Goto, Chiba (JP); Hitoshi Onishi, Chiba (JP); Gen Miyata, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 276 days.

(21) Appl. No.: 16/630,633

(22) PCT Filed: Jul. 6, 2018

(86) PCT No.: PCT/JP2018/025785
§ 371 (c)(1),
(2) Date: Jan. 13, 2020

(87) PCT Pub. No.: WO2019/013140
PCT Pub. Date: Jan. 17, 2019

(65) Prior Publication Data
US 2020/0148710 A1 May 14, 2020

(30) Foreign Application Priority Data

Jul. 14, 2017 (JP) .............................. JP2017-137754
Jan. 31, 2018 (JP) .............................. JP2018-015002

(51) Int. Cl.
*H01M 4/131* (2010.01)
*H01M 10/0525* (2010.01)
(Continued)

(52) U.S. Cl.
CPC .............. *C07F 9/14* (2013.01); *H01M 4/131* (2013.01); *H01M 10/0525* (2013.01);
(Continued)

(58) Field of Classification Search
CPC ......... H01M 10/0525; H01M 10/0567; H01M 2004/027; H01M 2004/028; H01M 2300/0025; H01M 4/131
See application file for complete search history.

(56) References Cited

U.S. PATENT DOCUMENTS 8,841,034 B2 * 9/2014 Tsujioka ........... H01M 10/0569
429/231.95
2012/0028132 A1 2/2012 Tsujioka et al.

FOREIGN PATENT DOCUMENTS

JP   H11-3728 A   1/1999
JP   3439002 B2   8/2003
(Continued)

OTHER PUBLICATIONS

International Search Report (PCT/ISA/210) dated Aug. 14, 2018, by the Japan Patent Office as the International Searching Authority for International Application No. PCT/JP2018/025785, and an English translation of the International Search Report.
(Continued)

*Primary Examiner* — Carlos Barcena
(74) *Attorney, Agent, or Firm* — Buchanan, Ingersoll & Rooney PC

(57) ABSTRACT

A lithium boron fluorophosphate complex compound including a compound A that is one selected from a group of
(Continued)

lithium boron fluorophosphates represented by Formula (I), and a compound B that is one selected from a group of compounds represented by Formulae (II) to (IX). $R_0$ represents a hydrocarbon group, $R^1$ to $R^7$ each independently represent a hydrogen atom or a substituent, $R^8, R^9, R^{10}, R^{11}$, and $R^{13}$ to $R^{21}$ each independently represent a substituent, and $R^{12}, R^{22}$, and $R^{23}$ each independently represent a divalent linking group.

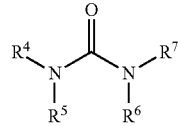

(I)

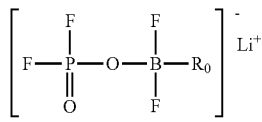

(II)

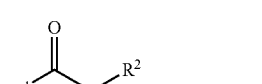

(III)

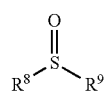

(IV)

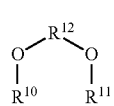

(V)

(VI)

(VII)

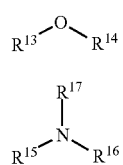

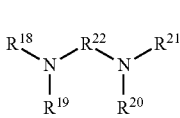

(VIII)

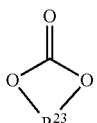

(IX)

11 Claims, 3 Drawing Sheets

(51) Int. Cl.
  *H01M 10/0567* (2010.01)
  *C07F 9/14* (2006.01)
  *H01M 4/02* (2006.01)

(52) U.S. Cl.
  CPC .. *H01M 10/0567* (2013.01); *H01M 2004/027* (2013.01); *H01M 2004/028* (2013.01); *H01M 2300/0025* (2013.01)

(56) References Cited

FOREIGN PATENT DOCUMENTS

| | | |
|---|---|---|
| JP | 4187959 B2 | 11/2008 |
| JP | 5544748 B2 | 7/2014 |
| WO | 2010122867 A1 | 10/2010 |
| WO | 2013/180658 A1 | 12/2013 |

OTHER PUBLICATIONS

Written Opinion (PCT/ISA/237) dated Aug. 14, 2018, by the Japan Patent Office as the International Searching Authority for International Application No. PCT/JP2018/025785.

\* cited by examiner

LITHIUM BORON FLUOROPHOSPHATE COMPLEX COMPOUND, LITHIUM BORON FLUOROPHOSPHATE-CONTAINING COMPOSITION, LITHIUM BORON FLUOROPHOSPHATE, ADDITIVE FOR LITHIUM SECONDARY BATTERY, NON-AQUEOUS ELECTROLYTIC SOLUTION FOR BATTERY, AND LITHIUM SECONDARY BATTERY

TECHNICAL FIELD

The present disclosure relates to a lithium boron fluorophosphate complex compound, a lithium boron fluorophosphate-containing composition, a lithium boron fluorophosphate, an additive for a lithium secondary battery, a non-aqueous electrolytic solution for a battery, and a lithium secondary battery.

BACKGROUND ART

Boron compounds are used in the field of electrochemistry, for example.

For example, a non-aqueous electrolytic solution for a lithium secondary battery, the solution including a borate selected from the group consisting of alkyl borates and halogen-containing borates, is known (see, for example, Patent Document 1).

A non-aqueous electrolytic solution containing an organoboron compound having a specific structure is known (see, for example, Patent Document 2).

A non-aqueous electrolytic solution battery including a non-aqueous electrolytic solution containing boronate and/or borinate is known (see, for example, Patent Document 3).

A compound such as $LiBF_3(PO_2F_2)$ is known as an electrolyte for electrochemical devices such as a lithium battery, a lithium ion battery, and an electric double layer capacitor (see, for example, Patent Document 4).

Patent Document 1: Japanese Patent Publication (JP-B) No. 4187959

Patent Document 2: Japanese Patent Application Laid-Open (JP-A) No. 11-3728

Patent Document 3: JP-B No. 3439002

Patent Document 4: JP-B No. 5544748

SUMMARY OF INVENTION

Technical Problem

An object of the disclosure is to provide a novel lithium boron fluorophosphate complex compound, a novel lithium boron fluorophosphate-containing composition, a novel lithium boron fluorophosphate, an additive for a lithium secondary battery, which can reduce battery resistance, a non-aqueous electrolytic solution for a battery, which can reduce battery resistance, and a lithium secondary battery reduced in battery resistance.

Solution to Problem

Solutions for solving the above problems encompass the following aspects.

<1> A lithium boron fluorophosphate complex compound comprising:

a compound A that is one selected from a group of lithium boron fluorophosphates represented by the following Formula (I); and a compound B that is one selected from a group of compounds represented by the following Formulae (II) to (IX):

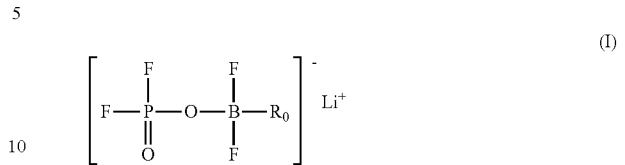

wherein, in Formula (I), $R_0$ represents a hydrocarbon group having from 1 to 20 carbon atoms wherein, in Formula (II), $R^1$ to $R^3$ each independently represent a hydrogen atom, an alkyl group optionally substituted with a halogen atom, an alkoxy group optionally substituted with a halogen atom, an alkenyl group optionally substituted with a halogen atom, an alkynyl group optionally substituted with a halogen atom, or an aryl group; and $R^1$ and $R^3$, or $R^2$ and $R^3$ are optionally combined to represent an alkylene group having from 2 to 9 carbon atoms;

in Formula (III), $R^4$ to $R^7$ each independently represent a hydrogen atom, an alkyl group optionally substituted with a halogen atom, an alkenyl group optionally substituted with a halogen atom, an alkynyl group optionally substituted with a halogen atom, or an aryl group; and $R^4$ and $R^5$, $R^6$ and $R^7$, or $R^5$ and $R^6$ are optionally combined to represent an alkylene group having from 2 to 9 carbon atoms;

in Formula (IV), $R^8$ and $R^9$ each independently represent an alkyl group optionally substituted with a halogen atom, an alkenyl group optionally substituted with a halogen atom, an alkynyl group optionally substituted with a halogen atom, or an aryl group; and $R^8$ and $R^9$ are optionally combined to represent an alkylene group having from 2 to 9 carbon atoms;

in Formula (V), $R^{10}$ and $R^{11}$ each independently represent an alkyl group optionally substituted with a halogen atom, an alkenyl group optionally substituted with a halogen atom, an alkynyl group optionally substituted with a halogen atom, or an aryl group; $R^{10}$ and $R^{11}$ are optionally combined to represent an alkylene group having from 2 to 9 carbon atoms or a sulfonylalkylenesulfonyl group having from 1 to 6 carbon atoms; and $R^{12}$ represents an alkylene group having from 1 to 4 carbon atoms, optionally substituted with at least one substituent selected from the group consisting of a halogen atom, an alkyl group optionally substituted with a halogen atom, an alkenyl group optionally substituted with a halogen atom, and an alkynyl group optionally substituted with a halogen atom;

in Formula (VI), $R^{13}$ and $R^{14}$ each independently represent an alkyl group optionally substituted with a halogen atom, an alkenyl group optionally substituted with a halogen atom, an alkynyl group optionally substituted with a halogen atom, or an aryl group; and $R^{13}$ and $R^{14}$ are optionally combined to represent a divalent aliphatic group having from 2 to 9 carbon atoms;

in Formula (VII), $R^{15}$ to $R^{17}$ each independently represent an alkyl group optionally substituted with a halogen atom, an alkenyl group optionally substituted with a halogen atom, an alkynyl group optionally substituted with a halogen atom, or an aryl group; and $R^{15}$, $R^{16}$ and $R^{17}$ are optionally combined to represent a divalent aliphatic group having from 2 to 9 carbon atoms;

in Formula (VIII), $R^{18}$ to $R^{21}$ each independently represent an alkyl group optionally substituted with a halogen atom, an alkenyl group optionally substituted with a halogen atom, an alkynyl group optionally substituted with a halogen atom, or an aryl group; $R^{18}$ and $R^{21}$ are optionally combined to represent an alkylene group having from 2 to 9 carbon atoms, and $R^{19}$ and $R^{20}$ are optionally combined to represent an alkylene group having from 2 to 9 carbon atoms; and $R^{22}$ represents an alkylene group having from 1 to 4 carbon atoms, optionally substituted with at least one substituent selected from the group consisting of a halogen atom, an alkyl group optionally substituted with a halogen atom, an alkenyl group optionally substituted with a halogen atom, and an alkynyl group optionally substituted with a halogen atom; and in Formula (IX), $R^{23}$ represents an alkylene group having from 2 to 9 carbon atoms, optionally substituted with at least one substituent selected from the group consisting of a halogen atom, an alkyl group optionally substituted with a halogen atom, an alkenyl group optionally substituted with a halogen atom, and an alkynyl group optionally substituted with a halogen atom.

<2> The lithium boron fluorophosphate complex compound according to <1>, wherein:

the compound A is one selected from a group of lithium boron fluorophosphates represented by the following Formula (X), and the compound B is one selected from the group consisting of N-methylpyrrolidone, 1,3-dimethyl-2-imidazolidinone, dimethoxyethane, 1,3-dioxolane, 1,4-dioxane, dimethyl sulfoxide, 1,5,2,4-dioxadithiane-2,2,4,4-tetraoxide, diethyl ether, furan, tetrahydrofuran, triethylamine, pyridine, triethylenediamine, 1,3-dioxolan-2-one, 4-methyl-1,3-dioxolan-2-one, and 4-fluoro-1,3-dioxolan-2-one:

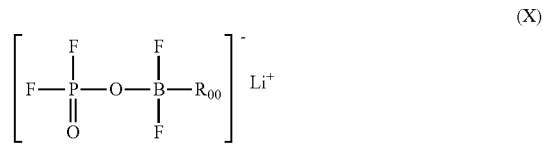

wherein, in Formula (X), $R_{00}$ represents a methyl group, an ethyl group, a propyl group, an isopropyl group, a n-butyl group, an isobutyl group, a vinyl group, an allyl group, an ethynyl group, a phenyl group, or a 4-fluorophenyl group.

<3> The lithium boron fluorophosphate complex compound according to <1> or <2>, wherein:

the compound A is one selected from the group consisting of lithium boron fluorophosphates represented by the following Formulae (XI) to (XIII); and the compound B is one selected from the group consisting of N-methylpyrrolidone, 1,3-dioxolan-2-one, 4-fluoro-1,3-dioxolan-2-one, diethyl ether, dimethoxyethane, tetrahydrofuran, 1,3-dioxolane, and pyridine:

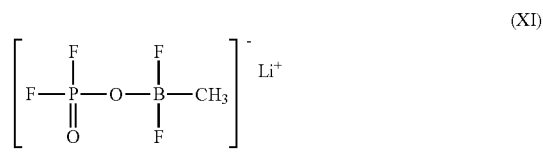

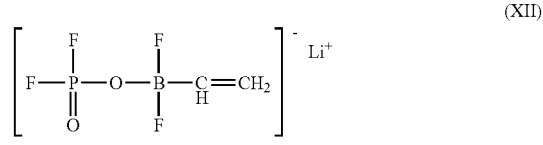

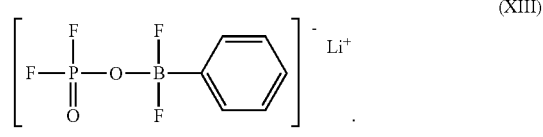

<4> A lithium boron fluorophosphate complex compound comprising at least one compound A selected from a group of lithium boron fluorophosphates represented by the following Formula (I):

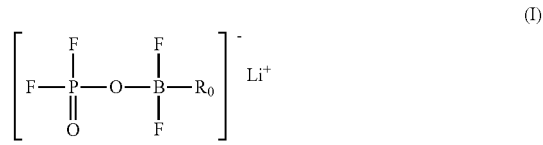

wherein, in Formula (I), $R_0$ represents a hydrocarbon group having from 1 to 20 carbon atoms.

<5> A lithium boron fluorophosphate-containing composition comprising at least one compound A selected from a group of lithium boron fluorophosphates represented by the following Formula (I):

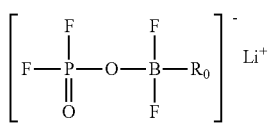

(I)

wherein, in Formula (I), $R_0$ represents a hydrocarbon group having from 1 to 20 carbon atoms.

<6> A lithium boron fluorophosphate represented by the following Formula (I):

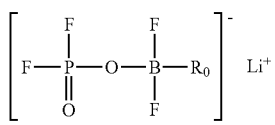

(I)

wherein, in Formula (I), $R_0$ represents a hydrocarbon group having from 1 to 20 carbon atoms.

<7> An additive for a lithium secondary battery, the additive comprising the lithium boron fluorophosphate complex compound according to any one of <1> to <4> or the lithium boron fluorophosphate according to <6>.

<8> A non-aqueous electrolytic solution for a battery, the solution comprising the lithium boron fluorophosphate complex compound according to any one of <1> to <4> or the lithium boron fluorophosphate according to <6>.

<9> A non-aqueous electrolytic solution for a battery, the solution further comprising an additive C that is a compound represented by the following Formula (C):

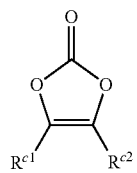

(C)

wherein, in Formula (C), $R^{c1}$ and $R^{c2}$ each independently represent a hydrogen atom, a methyl group, an ethyl group, or a propyl group.

<10> A lithium secondary battery comprising:
a positive electrode;
a negative electrode comprising, as a negative electrode active material, at least one selected from the group consisting of metallic lithium, a lithium-containing alloy, a metal or alloy capable of alloying with lithium, an oxide capable of doping and dedoping a lithium ion, a transition metal nitride capable of doping and dedoping a lithium ion, and a carbon material capable of doping and dedoping a lithium ion; and
the non-aqueous electrolytic solution for a battery according to <8> or <9>.

<11> A lithium secondary battery obtained by charging and discharging the lithium secondary battery according to <10>.

Advantageous Effects of Invention

According to the disclosure, a novel lithium boron fluorophosphate complex compound, a novel lithium boron fluorophosphate-containing composition, a novel lithium boron fluorophosphate, an additive for a lithium secondary battery, which can reduce battery resistance, a non-aqueous electrolytic solution for a battery, which can reduce battery resistance, and a lithium secondary battery reduced in battery resistance, are provided.

DESCRIPTION OF EMBODIMENTS

Figure 1:
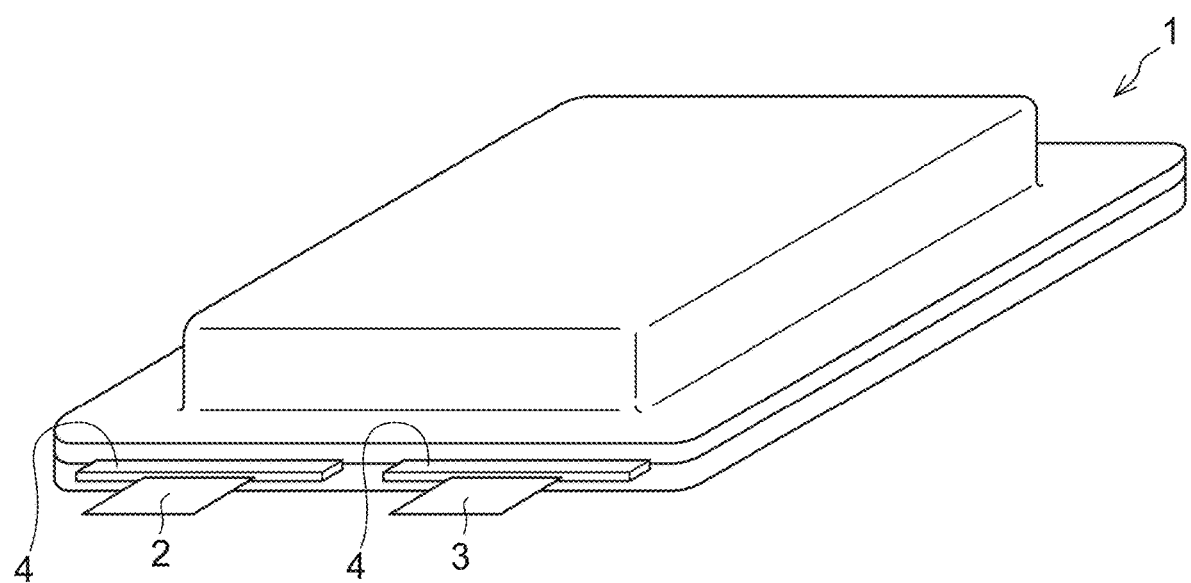
FIG. 1 is a schematic perspective view illustrating one example of a laminate-type battery as one example of the lithium secondary battery of the disclosure.

A numerical value range herein represented by "(from) . . . to . . . " in the description means that the range encompasses respective numerical values described before and after "to" as a lower limit and an upper limit, respectively.

In a case in which a plurality of substances corresponding to each component are present in a composition, the amount of such each component in the composition herein means the total amount of the plurality of substances present in the composition, unless particularly noted.

[Lithium Boron Fluorophosphate Complex Compound of First Embodiment]

A lithium boron fluorophosphate complex compound of a first embodiment in the disclosure comprises:
a compound A that is one selected from a group of lithium boron fluorophosphates represented by the following Formula (I); and
a compound B that is one selected from a group of compounds represented by the following Formulae (II) to (IX):

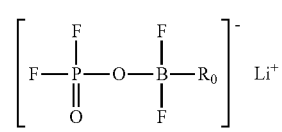

(I)

wherein, in Formula (I), $R_0$ represents a hydrocarbon group having from 1 to 20 carbon atoms

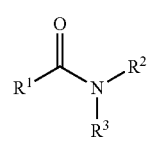

(II)

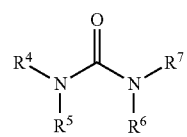

(III)

-continued

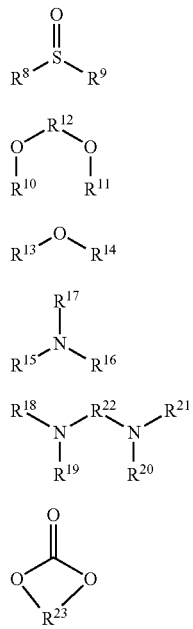

(IV)
(V)
(VI)
(VII)
(VIII)
(IX)

wherein, in Formula (II), $R^1$ to $R^3$ each independently represent a hydrogen atom, an alkyl group optionally substituted with a halogen atom, an alkoxy group optionally substituted with a halogen atom, an alkenyl group optionally substituted with a halogen atom, an alkynyl group optionally substituted with a halogen atom, or an aryl group; and $R^1$ and $R^3$, or $R^2$ and $R^3$ are optionally combined to represent an alkylene group having from 2 to 9 carbon atoms;

in Formula (III), $R^4$ to $R^7$ each independently represent a hydrogen atom, an alkyl group optionally substituted with a halogen atom, an alkenyl group optionally substituted with a halogen atom, an alkynyl group optionally substituted with a halogen atom, or an aryl group; and $R^4$ and $R^5$, $R^6$ and $R^7$, or $R^5$ and $R^6$ are optionally combined to represent an alkylene group having from 2 to 9 carbon atoms;

in Formula (IV), $R^8$ and $R^9$ each independently represent an alkyl group optionally substituted with a halogen atom, an alkenyl group optionally substituted with a halogen atom, an alkynyl group optionally substituted with a halogen atom, or an aryl group; and $R^8$ and $R^9$ are optionally combined to represent an alkylene group having from 2 to 9 carbon atoms;

in Formula (V), $R^{10}$ and $R^{11}$ each independently represent an alkyl group optionally substituted with a halogen atom, an alkenyl group optionally substituted with a halogen atom, an alkynyl group optionally substituted with a halogen atom, or an aryl group; $R^{10}$ and $R^{11}$ are optionally combined to represent an alkylene group having from 2 to 9 carbon atoms or a sulfonylalkylenesulfonyl group having from 1 to 6 carbon atoms; and $R^{12}$ represents an alkylene group having from 1 to 4 carbon atoms, optionally substituted with at least one substituent selected from the group consisting of a halogen atom, an alkyl group optionally substituted with a halogen atom, an alkenyl group optionally substituted with a halogen atom, and an alkynyl group optionally substituted with a halogen atom;

in Formula (VI), $R^{13}$ and $R^{14}$ each independently represent an alkyl group optionally substituted with a halogen atom, an alkenyl group optionally substituted with a halogen atom, an alkynyl group optionally substituted with a halogen atom, or an aryl group; and $R^{13}$ and $R^{14}$ are optionally combined to represent a divalent aliphatic group having from 2 to 9 carbon atoms;

in Formula (VII), $R^{15}$ to $R^{17}$ each independently represent an alkyl group optionally substituted with a halogen atom, an alkenyl group optionally substituted with a halogen atom, an alkynyl group optionally substituted with a halogen atom, or an aryl group; and $R^{15}$, $R^{16}$ and $R^{17}$ are optionally combined to represent a divalent aliphatic group having from 2 to 9 carbon atoms;

in Formula (VIII), $R^{18}$ to $R^{21}$ each independently represent an alkyl group optionally substituted with a halogen atom, an alkenyl group optionally substituted with a halogen atom, an alkynyl group optionally substituted with a halogen atom, or an aryl group; $R^{18}$ and $R^{21}$ are optionally combined to represent an alkylene group having from 2 to 9 carbon atoms, and $R^{19}$ and $R^{20}$ are optionally combined to represent an alkylene group having from 2 to 9 carbon atoms; and $R^{22}$ represents an alkylene group having from 1 to 4 carbon atoms, optionally substituted with at least one substituent selected from the group consisting of a halogen atom, an alkyl group optionally substituted with a halogen atom, an alkenyl group optionally substituted with a halogen atom, and an alkynyl group optionally substituted with a halogen atom; and in Formula (IX), $R^{23}$ represents an alkylene group having from 2 to 9 carbon atoms, optionally substituted with at least one substituent selected from the group consisting of a halogen atom, an alkyl group optionally substituted with a halogen atom, an alkenyl group optionally substituted with a halogen atom, and an alkynyl group optionally substituted with a halogen atom.

The lithium boron fluorophosphate complex compound of the first embodiment does not exhibit any respective melting points and boiling points of the compound A and the compound B, but exhibits an endothermic thermal dissociation behavior at a temperature not observed with respect to the compound A and the compound B.

That is, the lithium boron fluorophosphate complex compound of the first embodiment is a novel compound different from both the compound A and compound B in terms of thermophysical properties.

Patent Document 4 described above discloses $LiBF_3(PO_2F_2)$ as a lithium boron fluorophosphate.

On the contrary, the lithium boron fluorophosphate complex compound of the first embodiment is a complex compound including the compound A as a lithium boron fluorophosphate, and the compound B, in which two fluorine atoms and one $R_0$ (namely, a hydrocarbon group having from 1 to 20 carbon atoms) are bonded to a boron atom in the compound A. From such a viewpoint, the lithium boron fluorophosphate complex compound of the first embodiment is different from $LiBF_3(PO_2F_2)$, which is not a complex compound and in which three fluorine atoms are bonded to a boron atom.

Next, the compound A and the compound B forming the lithium boron fluorophosphate complex compound of the first embodiment are described.

<Compound A>

The compound A is one selected from a group of lithium boron fluorophosphates represented by the following Formula (I).

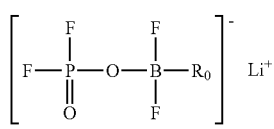 (I)

In Formula (I), $R_0$ represents a hydrocarbon group having from 1 to 20 carbon atoms.

Examples of the hydrocarbon group represented by $R_0$ include an aliphatic group having from 1 to 12 carbon atoms and an optionally substituted aryl group having from 6 to 20 carbon atoms.

Examples of a substituent with which the aryl group is optionally substituted (hereinafter, also referred to as "substituent which can be contained in Formula (I)"), in the optionally substituted aryl group having from 6 to 20 carbon atoms, which can be contained in Formula (I), include a halogen atom, an unsubstituted alkyl group, a halogenated alkyl group, an unsubstituted alkoxy group, a halogenated alkoxy group, an unsubstituted alkenyl group, a halogenated alkenyl group, an unsubstituted alkynyl group, and a halogenated alkynyl group.

The halogen atom serving as the substituent which can be contained in Formula (I) is preferably a fluorine atom, a chlorine atom, a bromine atom, or an iodine atom, more preferably a fluorine atom, a chlorine atom, or a bromine atom, still more preferably a fluorine atom or a chlorine atom, particularly preferably a fluorine atom.

Preferable modes of halogen atoms contained in the structures of the halogenated alkyl group, the halogenated alkoxy group, the halogenated alkenyl group, and the halogenated alkynyl group each serving as the substituent which can be contained in Formula (I) are each the same as a preferable mode of the halogen atom serving as the substituent which can be contained in Formula (I).

The unsubstituted alkyl group serving as the substituent which can be contained in Formula (I) is preferably an alkyl group having from 1 to 12 carbon atoms, more preferably an alkyl group having from 1 to 6 carbon atoms, still more preferably an alkyl group having from 1 to 3 carbon atoms.

The unsubstituted alkoxy group serving as the substituent which can be contained in Formula (I) is preferably an alkoxy group having from 1 to 12 carbon atoms, more preferably an alkoxy group having from 1 to 6 carbon atoms, still more preferably an alkoxy group having from 1 to 3 carbon atoms.

The unsubstituted alkenyl group serving as the substituent which can be contained in Formula (I) is preferably an alkenyl group having from 2 to 12 carbon atoms, more preferably an alkenyl group having from 2 to 6 carbon atoms, still more preferably an alkenyl group having from 2 to 3 carbon atoms.

The unsubstituted alkynyl group serving as the substituent which can be contained in Formula (I) is preferably an alkynyl group having from 2 to 12 carbon atoms, more preferably an alkynyl group having from 2 to 6 carbon atoms, still more preferably an alkynyl group having from 2 to 3 carbon atoms.

Preferable ranges of the numbers of carbon atoms in the halogenated alkyl group, the halogenated alkoxy group, the halogenated alkenyl group, and the halogenated alkynyl group each serving as the substituent which can be contained in Formula (I) are the same as preferable ranges of the numbers of carbon atoms in the unsubstituted alkyl group, the unsubstituted alkoxy group, the unsubstituted alkenyl group, and the unsubstituted alkynyl group each serving as the substituent which can be contained in Formula (I), respectively.

Specific examples of the optionally substituted aryl group having from 6 to 20 carbon atoms, which can be contained in Formula (I), include a phenyl group; a group obtained by removing one hydrogen atom from alkylbenzene (for example, a benzyl group, a tolyl group, a xylyl group, or a mesityl group); a naphthyl group; and a group obtained by removing one hydrogen atom from naphthalene substituted with an alkyl group.

The optionally substituted aryl group having from 6 to 20 carbon atoms is preferably a phenyl group, a 4-methylphenyl group, or a 4-fluorophenyl group, more preferably a phenyl group.

The aliphatic group having from 1 to 12 carbon atoms, which can be contained in Formula (I), may be a saturated aliphatic group (namely, an alkyl group) or an unsaturated aliphatic group (namely, an alkenyl group or an alkynyl group).

The aliphatic group having from 1 to 12 carbon atoms, which can be contained in Formula (I), may also have a branched structure and/or a cyclic structure.

Specific examples of the aliphatic group having from 1 to 12 carbon atoms, which can be contained in Formula (I), include linear or branched saturated aliphatic groups (namely, alkyl groups) such as a methyl group, an ethyl group, a n-propyl group, an isopropyl group, a 1-ethylpropyl group, a n-butyl group, an isobutyl group, a sec-butyl group, a tert-butyl group, a 2-methylbutyl group, a 3,3-dimethylbutyl group, a n-pentyl group, an isopentyl group, a neopentyl group, a 1-methylpentyl group, a n-hexyl group, an isohexyl group, a sec-hexyl group, a tert-hexyl group, a n-heptyl group, an isoheptyl group, a sec-heptyl group, a tert-heptyl group, a n-octyl group, an isooctyl group, a sec-octyl group, a tert-octyl group, a nonyl group, a decyl group, an undecyl group, and a dodecyl group;

linear or branched unsaturated aliphatic groups (namely, alkenyl groups or alkynyl groups) such as a vinyl group, a 1-propenyl group, an allyl group (2-propenyl group), an isopropenyl group, a 1-butenyl group, a 2-butenyl group, a 3-butenyl group, a pentenyl group, a hexenyl group, a 2-methyl-2-propenyl group, a 1-methyl-2-propenyl group, a 2-methyl-1-propenyl group, a hexenyl group, an ethynyl group, a 1-propynyl group, a 2-propynyl group (having the same definition as a propargyl group), a 1-butynyl group, a 2-butynyl group, a 3-butynyl group, a 1-pentynyl group, a 2-pentynyl group, a 3-pentynyl group, a 4-pentynyl group, 5-hexynyl group, a 1-methyl-2-propynyl group, a 2-methyl-3-butynyl group, a 2-methyl-3-pentynyl group, a 1-methyl-2-butynyl group, 1,1-dimethyl-2-propynyl, a 1,1-dimethyl-2-butynyl group, and a 1-hexynyl group; and cyclic aliphatic groups such as a cyclopropyl group, a cyclobutyl group, a cyclopentyl group, a cyclohexyl group, a cycloheptyl group, a 1-cyclopentenyl group, and a 1-cyclohexenyl group.

The aliphatic group having from 1 to 12 carbon atoms, which can be contained in Formula (I), is preferably a methyl group, an ethyl group, a propyl group, an isopropyl group, a n-butyl group, an isobutyl group, a vinyl group, an allyl group, or an ethynyl group, more preferably a methyl group or a vinyl group, still more preferably a methyl group.

$R_0$ in Formula (I) is preferably a methyl group, an ethyl group, a propyl group, an isopropyl group, a n-butyl group, an isobutyl group, a vinyl group, an allyl group, an ethynyl group, a phenyl group, or a 4-fluorophenyl group, more preferably a methyl group, a vinyl group, or a phenyl group.

In other words, the compound A is preferably one selected from a group of lithium boron fluorophosphates represented by the following Formula (X), more preferably one selected from the group consisting of lithium boron fluorophosphates represented by the following Formulae (XI) to (XIII).

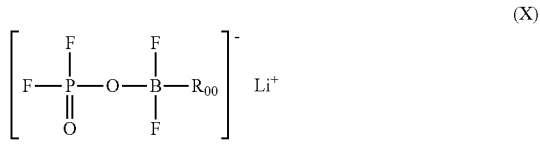

In Formula (X), $R_{00}$ represents a methyl group, an ethyl group, a propyl group, an isopropyl group, a n-butyl group, an isobutyl group, a vinyl group, an allyl group, an ethynyl group, a phenyl group, or a 4-fluorophenyl group.

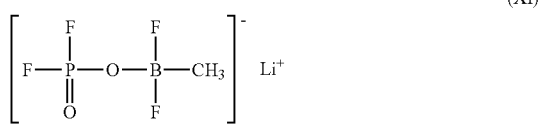

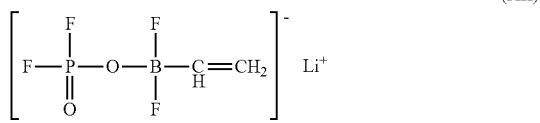

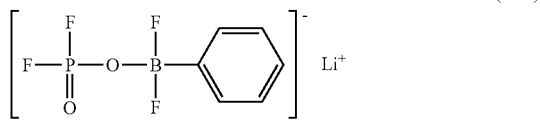

<Compound B>

The compound B is one selected from a group of compounds represented by Formulae (II) to (IX).

Hereinafter, a compound represented by Formula (II), a compound represented by Formula (III), a compound represented by Formula (IV), a compound represented by Formula (V), a compound represented by Formula (VI), a compound represented by Formula (VII), a compound represented by Formula (VIII), and a compound represented by Formula (IX) constituting the group of compounds represented by Formulae (II) to (IX) will be described.

(Compound Represented by Formula (II))

In Formula (II), $R^1$ to $R^3$ each independently represent a hydrogen atom, an alkyl group optionally substituted with a halogen atom, an alkoxy group optionally substituted with a halogen atom, an alkenyl group optionally substituted with a halogen atom, an alkynyl group optionally substituted with a halogen atom, or an aryl group. $R^1$ and $R^3$, or $R^2$ and $R^3$ are optionally combined to represent an alkylene group having from 2 to 9 carbon atoms.

In Formula (II), the alkyl group optionally substituted with a halogen atom means an unsubstituted alkyl group or a halogenated alkyl group.

The halogenated alkyl group means an alkyl group substituted with at least one halogen atom.

The unsubstituted alkyl group and the halogenated alkyl group may be each linear, branched, or cyclic.

In Formula (II), the alkyl group optionally substituted with a halogen atom is preferably an unsubstituted alkyl group having from 1 to 12 carbon atoms or a halogenated alkyl group having from 1 to 6 carbon atoms, more preferably a methyl group or an ethyl group, still more preferably a methyl group.

In Formula (II), the alkoxy group optionally substituted with a halogen atom means an unsubstituted alkoxy group or a halogenated alkoxy group.

The halogenated alkoxy group means an alkoxy group substituted with at least one halogen atom.

The unsubstituted alkoxy group and the halogenated alkoxy group may be each linear, branched, or cyclic.

In Formula (II), the alkoxy group optionally substituted with a halogen atom is preferably an unsubstituted alkoxy group having from 1 to 6 carbon atoms or a halogenated alkoxy group having from 1 to 6 carbon atoms, more preferably a methoxy group or an ethoxy group, still more preferably a methoxy group.

In Formula (II), the alkenyl group optionally substituted with a halogen atom means an unsubstituted alkenyl group or a halogenated alkenyl group.

The halogenated alkenyl group means an alkenyl group substituted with at least one halogen atom.

The unsubstituted alkenyl group and the halogenated alkenyl group may be each linear, branched, or cyclic.

In Formula (II), the alkenyl group optionally substituted with a halogen atom is preferably an unsubstituted alkenyl group having from 2 to 6 carbon atoms or a halogenated alkenyl group having from 2 to 6 carbon atoms, more preferably a vinyl group, a 1-propenyl group, an allyl group, or an isopropenyl group, still more preferably a vinyl group.

In Formula (II), the alkynyl group optionally substituted with a halogen atom means an unsubstituted alkynyl group or a halogenated alkynyl group.

The halogenated alkynyl group means an alkynyl group substituted with at least one halogen atom.

The unsubstituted alkynyl group and the halogenated alkynyl group may be each linear, branched, or cyclic.

In Formula (II), the alkynyl group optionally substituted with a halogen atom is preferably an unsubstituted alkynyl group having from 2 to 6 carbon atoms or a halogenated alkynyl group having from 2 to 6 carbon atoms, more preferably an ethynyl group, a 1-propynyl group, or a 2-propynyl group (having the same definition as a propargyl group), still more preferably an ethynyl group.

In Formula (II), the aryl group means an optionally substituted aryl group, namely, an unsubstituted aryl group or a substituted aryl group.

In Formula (II), examples of the substituent in the substituted aryl group include a halogen atom, an unsubstituted alkyl group, a halogenated alkyl group, an unsubstituted alkoxy group, a halogenated alkoxy group, an unsubstituted alkenyl group, a halogenated alkenyl group, an unsubstituted alkynyl group, and a halogenated alkynyl group. A preferable mode of the substituent in the substituted aryl group in Formula (II) is the same as a preferable mode of the substituent which can be contained in Formula (I).

The number of carbon atoms in the aryl group in Formula (II) is preferably 6 to 20.

The aryl group in Formula (II) is preferably a phenyl group, a 4-methylphenyl group, or a 4-fluorophenyl group, more preferably a phenyl group.

In a case in which $R^1$ and $R^3$, or $R^2$ and $R^3$ are combined to represent an alkylene group having from 2 to 9 carbon atoms in Formula (II), the alkylene group having from 2 to 9 carbon atoms may be linear, branched, or cyclic.

Examples of the alkylene group having from 2 to 9 carbon atoms include an ethylene group, a propylene group, a butylene group, a pentylene group, a hexylene group, a heptylene group, and an octylene group.

The alkylene group having from 2 to 9 carbon atoms is preferably an alkylene group having from 2 to 6 carbon atoms, more preferably an alkylene group having from 2 to 4 carbon atoms, still more preferably a propylene group.

The "alkylene group having from 2 to 9 carbon atoms" in the disclosure encompasses both an unsubstituted alkylene group having from 2 to 9 carbon atoms and a substituted alkylene group having from 2 to 9 carbon atoms.

Examples of the substituent in the substituted alkylene group having from 2 to 9 carbon atoms include a halogen atom, an unsubstituted alkyl group, a halogenated alkyl group, an unsubstituted alkoxy group, a halogenated alkoxy group, an unsubstituted alkenyl group, a halogenated alkenyl group, an unsubstituted alkynyl group, and a halogenated alkynyl group. A preferable mode of the substituent in the substituted alkylene group having from 2 to 9 carbon atoms is the same as a preferable mode of the substituent which can be contained in Formula (I).

Examples of the compound represented by Formula (II) include N,N-dimethylformamide, N,N-dimethylacetamide, N,N-diethylacetamide, N,N-diphenylacetamide, N,N-dimethylacrylamide, N-methylpyrrolidone, and N-vinylpyrrolidone, and N-methylpyrrolidone, N,N-dimethylformamide, N,N-dimethylacrylamide, or N-vinylpyrrolidone is preferable, and N-methylpyrrolidone is more preferable.

(Compound Represented by Formula (III))

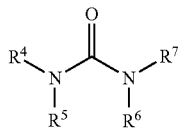

(III)

In Formula (III), $R^4$ to $R^7$ each independently represent a hydrogen atom, an alkyl group optionally substituted with a halogen atom, an alkenyl group optionally substituted with a halogen atom, an alkynyl group optionally substituted with a halogen atom, or an aryl group. $R^4$ and $R^5$, $R^6$ and $R^7$, or $R^5$ and $R^6$ are optionally combined to represent an alkylene group having from 2 to 9 carbon atoms.

The alkyl group optionally substituted with a halogen atom in Formula (III) has the same definition as the alkyl group optionally substituted with a halogen atom in Formula (II).

The alkyl group optionally substituted with a halogen atom in Formula (III) is preferably unsubstituted alkyl group having from 1 to 12 carbon atoms or a halogenated alkyl group having from 1 to 6 carbon atoms, more preferably an unsubstituted alkyl group having from 1 to 2 carbon atoms, still more preferably a methyl group.

The alkenyl group optionally substituted with a halogen atom in Formula (III) has the same definition as the alkenyl group optionally substituted with a halogen atom in Formula (II).

The alkenyl group optionally substituted with a halogen atom in Formula (III) is preferably an unsubstituted alkenyl group having from 2 to 6 carbon atoms or a halogenated alkenyl group having from 2 to 6 carbon atoms.

The alkynyl group optionally substituted with a halogen atom in Formula (III) has the same definition as the alkynyl group optionally substituted with a halogen atom in Formula (II).

The alkynyl group optionally substituted with a halogen atom in Formula (III) is preferably an unsubstituted alkynyl group having from 2 to 6 carbon atoms or a halogenated alkynyl group having from 2 to 6 carbon atoms.

The aryl group in Formula (III) has the same definition as the aryl group in Formula (II).

The aryl group in Formula (III) is preferably a phenyl group, a 4-methylphenyl group, or a 4-fluorophenyl group, more preferably a phenyl group.

In a case in which $R^4$ and $R^5$, $R^6$ and $R^7$, or $R^5$ and $R^6$ are combined to represent an alkylene group having from 2 to 9 carbon atoms in Formula (III), the alkylene group having from 2 to 9 carbon atoms has the same definition as the alkylene group having from 2 to 9 carbon atoms in Formula (II).

The alkylene group having from 2 to 9 carbon atoms in Formula (III) is preferably an alkylene group having from 2 to 6 carbon atoms, more preferably an alkylene group having from 2 to 3 carbon atoms, still more preferably an ethylene group.

Examples of the compound represented by Formula (III) include 1,3-dimethyl-2-imidazolidinone and tetramethylurea, and 1,3-dimethyl-2-imidazolidinone is preferable.

(Compound Represented by Formula (IV))

(IV)

In Formula (IV), $R^8$ and $R^9$ each independently represent an alkyl group optionally substituted with a halogen atom, an alkenyl group optionally substituted with a halogen atom, an alkynyl group optionally substituted with a halogen atom, or an aryl group. $R^8$ and $R^9$ are optionally combined to represent an alkylene group having from 2 to 9 carbon atoms.

The alkyl group optionally substituted with a halogen atom in Formula (IV) has the same definition as the alkyl group optionally substituted with a halogen atom in Formula (II).

The alkyl group optionally substituted with a halogen atom in Formula (IV) is preferably an unsubstituted alkyl group having from 1 to 12 carbon atoms or a halogenated alkyl group having from 1 to 6 carbon atoms, more preferably a methyl group or a trifluoromethyl group, still more preferably a methyl group.

The alkenyl group optionally substituted with a halogen atom in Formula (IV) has the same definition as the alkenyl group optionally substituted with a halogen atom in Formula (II).

The alkenyl group optionally substituted with a halogen atom in Formula (IV) is preferably an unsubstituted alkenyl group having from 2 to 6 carbon atoms or a halogenated alkenyl group having from 2 to 6 carbon atoms, more preferably a vinyl group or an allyl group.

The alkynyl group optionally substituted with a halogen atom in Formula (IV) has the same definition as the alkynyl group optionally substituted with a halogen atom in Formula (II).

The alkynyl group optionally substituted with a halogen atom in Formula (IV) is preferably an unsubstituted alkynyl group having from 2 to 6 carbon atoms or a halogenated alkynyl group having from 2 to 6 carbon atoms.

The aryl group in Formula (IV) has the same definition as the aryl group in Formula (II).

The aryl group in Formula (IV) is preferably a phenyl group, a 4-methylphenyl group, or a 4-fluorophenyl group, more preferably a phenyl group.

In a case in which $R^8$ and $R^9$ are combined to represent an alkylene group having from 2 to 9 carbon atoms in Formula (IV), the alkylene group having from 2 to 9 carbon atoms has the same definition as the alkylene group having from 2 to 9 carbon atoms in Formula (II).

In Formula (IV), the alkylene group having from 2 to 9 carbon atoms is preferably an alkylene group having from 2 to 6 carbon atoms, more preferably an alkylene group having from 2 to 3 carbon atoms, still more preferably an ethylene group.

Examples of the compound represented by Formula (IV) include dimethyl sulfoxide, methyl phenyl sulfoxide, diphenyl sulfoxide, phenyl trifluoromethyl sulfoxide, phenyl vinyl sulfoxide, and allyl(4-methylphenyl) sulfoxide, and dimethyl sulfoxide is preferable.

(Compound Represented by Formula (V))

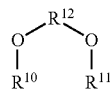

(V)

In Formula (V), $R^{10}$ and $R^{11}$ each independently represent an alkyl group optionally substituted with a halogen atom, an alkenyl group optionally substituted with a halogen atom, an alkynyl group optionally substituted with a halogen atom, or an aryl group. $R^{10}$ and $R^{11}$ are optionally combined to represent an alkylene group having from 2 to 9 carbon atoms or a sulfonylalkylenesulfonyl group having from 1 to 6 carbon atoms.

$R^{12}$ represents an alkylene group having from 1 to 4 carbon atoms, optionally substituted with at least one substituent selected from the group consisting of a halogen atom, an alkyl group optionally substituted with a halogen atom, an alkenyl group optionally substituted with a halogen atom, and an alkynyl group optionally substituted with a halogen atom.

The alkyl group optionally substituted with a halogen atom in Formula (V) has the same definition as the alkyl group optionally substituted with a halogen atom in Formula (II).

The alkyl group optionally substituted with a halogen atom in Formula (V) is preferably an unsubstituted alkyl group having from 1 to 12 carbon atoms or a halogenated alkyl group having from 1 to 6 carbon atoms, more preferably a methyl group or an ethyl group.

The alkenyl group optionally substituted with a halogen atom in Formula (V) has the same definition as the alkenyl group optionally substituted with a halogen atom, which can be contained in Formula (II).

The alkenyl group optionally substituted with a halogen atom in Formula (V) is preferably an unsubstituted alkenyl group having from 2 to 6 carbon atoms or a halogenated alkenyl group having from 2 to 6 carbon atoms.

The alkynyl group optionally substituted with a halogen atom in Formula (V) has the same definition as the alkynyl group optionally substituted with a halogen atom in Formula (II).

The alkynyl group optionally substituted with a halogen atom in Formula (V) is preferably an unsubstituted alkynyl group having from 2 to 6 carbon atoms or a halogenated alkynyl group having from 2 to 6 carbon atoms.

The aryl group in Formula (V) has the same definition as the aryl group in Formula (II).

The aryl group in Formula (V) is preferably a phenyl group, a 4-methylphenyl group, or a 4-fluorophenyl group, more preferably a phenyl group.

In a case in which $R^{10}$ and $R^{11}$ are combined to represent an alkylene group having from 2 to 9 carbon atoms in Formula (V), the alkylene group having from 2 to 9 carbon atoms has the same definition as the alkylene group having from 2 to 9 carbon atoms in Formula (II).

The alkylene group having from 2 to 9 carbon atoms in Formula (V) is preferably an alkylene group having from 2 to 6 carbon atoms, more preferably an alkylene group having from 2 to 3 carbon atoms, still more preferably an ethylene group.

The sulfonylalkylenesulfonyl group having from 1 to 6 carbon atoms in Formula (V) represents a group represented by the following Formula (a). In Formula (a), n is an integer of from 1 to 6, and * represents a bonding position.

n is preferably an integer of from 1 to 3, more preferably 1.

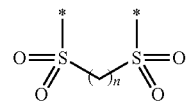

(a)

In Formula (V), the alkylene group having from 1 to 4 carbon atoms, represented by $R^{12}$, optionally substituted with at least one substituent selected from the group consisting of a halogen atom, an alkyl group optionally substituted with a halogen atom, an alkenyl group optionally substituted with a halogen atom, and an alkynyl group optionally substituted with a halogen atom, may be linear or branched.

A preferable mode of the substituent in Formula (V) is the same as a preferable mode of the substituent which can be contained in Formula (I).

In Formula (V), the alkylene group having from 1 to 4 carbon atoms, represented by $R^{12}$, is preferably a methylene group, a difluoromethylene group, an ethylene group, a fluoroethylene group, or an isopropylene group, more preferably an ethylene group or a fluoroethylene group.

Examples of the compound represented by Formula (V) include dimethoxymethane, methoxyethoxymethane, diethoxymethane, methoxyphenoxymethane, 1,3-dioxolane, 4-methyl-1,3-dioxolane, 1,3-dioxane, 4-methyl-1,3-dioxane, 4-phenyl-1,3-dioxane, 1,3-dioxepane, dimethoxyethane, diethoxyethane, 1,4-dioxane, and 1,5,2,4-dioxadithiane-2,2,4,4-tetraoxide, dimethoxyethane, 1,3-dioxolane, 1,4-dioxane, or 1,5,2,4-dioxadithiane-2,2,4,4-tetraoxidedimethyl sulfoxide is preferable, and dimethoxyethane or 1,3-dioxolane is more preferable.

(Compound Represented by Formula (VI))

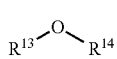
(VI)

In Formula (VI), $R^{13}$ and $R^{14}$ each independently represent an alkyl group optionally substituted with a halogen atom, an alkenyl group optionally substituted with a halogen atom, an alkynyl group optionally substituted with a halogen atom, or an aryl group. $R^{13}$ and $R^{14}$ are optionally combined to represent a divalent aliphatic group having from 2 to 9 carbon atoms.

The alkyl group optionally substituted with a halogen atom in Formula (VI) has the same definition as the alkyl group optionally substituted with a halogen atom in Formula (II).

The alkyl group optionally substituted with a halogen atom in Formula (VI) is preferably an unsubstituted alkyl group having from 1 to 12 carbon atoms or a halogenated alkyl group having from 1 to 6 carbon atoms, more preferably an ethyl group.

The alkenyl group optionally substituted with a halogen atom in Formula (VI) has the same definition as the alkenyl group optionally substituted with a halogen atom in Formula (II).

The alkenyl group optionally substituted with a halogen atom in Formula (VI) is preferably an unsubstituted alkenyl group having from 2 to 6 carbon atoms or a halogenated alkenyl group having from 2 to 6 carbon atoms.

The alkynyl group optionally substituted with a halogen atom in Formula (VI) has the same definition as the alkynyl group optionally substituted with a halogen atom in Formula (II).

The alkynyl group optionally substituted with a halogen atom in Formula (VI) is preferably an unsubstituted alkynyl group having from 2 to 6 carbon atoms or a halogenated alkynyl group having from 2 to 6 carbon atoms.

The aryl group in Formula (VI) has the same definition as the aryl group in Formula (II).

The aryl group in Formula (VI) is preferably a phenyl group, a 4-methylphenyl group, or a 4-fluorophenyl group, more preferably a phenyl group.

In a case in which $R^{13}$ and $R^{14}$ are combined to represent a divalent aliphatic group having from 2 to 9 carbon atoms in Formula (VI), the divalent aliphatic group having from 2 to 9 carbon atoms may be linear or branched, and may be either saturated or unsaturated.

Examples of the divalent aliphatic group having from 2 to 9 carbon atoms in Formula (VI) include an ethylene group, a propylene group, an isopropylene group, a butylene group, a 1,3-butadiene-1,4-diyl group, an isobutylene group, a pentylene group, a hexylene group, a heptylene group, and an octylene group.

The divalent aliphatic group having from 2 to 9 carbon atoms in Formula (VI) is preferably a divalent aliphatic group having from 4 to 6 carbon atoms, more preferably a butylene group or a 1,3-butadiene-1,4-diyl group.

Examples of the compound represented by Formula (VI) include dimethyl ether, diethyl ether, dipropyl ether, diisopropyl ether, dibutyl ether, methyl-t-butyl ether, dipentyl ether, dihexyl ether, dioctyl ether, didodecyl ether, dicyclohexyl ether, diphenyl ether, bis(2,2,2-trifluoroethyl)ether, furan, and tetrahydrofuran, diethyl ether, methyl-t-butyl ether, furan, or tetrahydrofuran is preferable, and diethyl ether or tetrahydrofuran is more preferable.

(Compound Represented by Formula (VII))

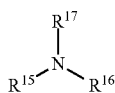
(VII)

In Formula (VII), $R^{15}$ to $R^{17}$ each independently represent an alkyl group optionally substituted with a halogen atom, an alkenyl group optionally substituted with a halogen atom, an alkynyl group optionally substituted with a halogen atom, or an aryl group. $R^{15}$, $R^{16}$ and $R^{17}$ are optionally combined to represent a divalent aliphatic group having from 2 to 9 carbon atoms.

The alkyl group optionally substituted with a halogen atom in Formula (VII) has the same definition as the alkyl group optionally substituted with a halogen atom in Formula (II).

The alkyl group optionally substituted with a halogen atom in Formula (VII) is preferably an unsubstituted alkyl group having from 1 to 12 carbon atoms or a halogenated alkyl group having from 1 to 6 carbon atoms, more preferably an ethyl group.

The alkenyl group optionally substituted with a halogen atom in Formula (VII) has the same definition as the alkenyl group optionally substituted with a halogen atom in Formula (II).

The alkenyl group optionally substituted with a halogen atom in Formula (VII) is preferably an unsubstituted alkenyl group having from 2 to 6 carbon atoms or a halogenated alkenyl group having from 2 to 6 carbon atoms.

The alkynyl group optionally substituted with a halogen atom in Formula (VII) has the same definition as the alkynyl group optionally substituted with a halogen atom in Formula (II).

The alkynyl group optionally substituted with a halogen atom in Formula (VII) is preferably an unsubstituted alkynyl group having from 2 to 6 carbon atoms or a halogenated alkynyl group having from 2 to 6 carbon atoms.

The aryl group in Formula (VII) has the same definition as the aryl group in Formula (II).

The aryl group in Formula (VII) is preferably a phenyl group, a 4-methylphenyl group, or a 4-fluorophenyl group, more preferably a phenyl group.

In a case in which $R^{15}$, $R^{16}$ and $R^{17}$ are combined to represent a divalent aliphatic group having from 2 to 9 carbon atoms in Formula (VII), the divalent aliphatic group having from 2 to 9 carbon atoms has the same definition as the divalent aliphatic group having from 2 to 9 carbon atoms in Formula (VI).

The divalent aliphatic group having from 2 to 9 carbon atoms in Formula (VII) is preferably an alkylene group having from 4 to 6 carbon atoms, more preferably a pentylene group or a 1,3,5-pentatrien-1,5-diyl group.

Examples of the compound represented by Formula (VII) include triethylamine, tripropylamine, triisopropylamine, tributylamine, triisobutylamine, tripentylamine, trihexylamine, trioctylamine, tridodecylamine, N,N-dimethylcyclohexylamine, N,N-dimethyl aniline, N,N-diethylaniline, 1-methylpyrrolidine, 1-methylpiperidine, and pyridine, triethylamine, N,N-dimethylcyclohexylamine, N,N-dimethylaniline, or pyridine is preferable, and triethylamine or pyridine is more preferable.

(Compound Represented by Formula (VIII))

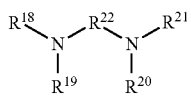

(VIII)

In Formula (VIII), $R^{18}$ to $R^{21}$ each independently represent an alkyl group optionally substituted with a halogen atom, an alkenyl group optionally substituted with a halogen atom, an alkynyl group optionally substituted with a halogen atom, or an aryl group. $R^{18}$ and $R^{21}$ are, and $R^{19}$ and $R^{20}$ are, optionally combined to represent an alkylene group having from 2 to 9 carbon atoms. $R^{22}$ represents an alkylene group having from 1 to 4 carbon atoms, optionally substituted with at least one substituent selected from the group consisting of a halogen atom, an alkyl group optionally substituted with a halogen atom, an alkenyl group optionally substituted with a halogen atom, and an alkynyl group optionally substituted with a halogen atom.

The alkyl group optionally substituted with a halogen atom in Formula (VIII) has the same definition as the alkyl group optionally substituted with a halogen atom in Formula (II).

The alkyl group optionally substituted with a halogen atom in Formula (VIII) is preferably an unsubstituted alkyl group having from 1 to 12 carbon atoms or a halogenated alkyl group having from 1 to 6 carbon atoms, more preferably an ethyl group.

The alkenyl group optionally substituted with a halogen atom in Formula (VIII) has the same definition as the alkenyl group optionally substituted with a halogen atom in Formula (II).

The alkenyl group optionally substituted with a halogen atom in Formula (VIII) is preferably an unsubstituted alkenyl group having from 2 to 6 carbon atoms or a halogenated alkenyl group having from 2 to 6 carbon atoms.

The alkynyl group optionally substituted with a halogen atom in Formula (VIII) has the same definition as the alkynyl group optionally substituted with a halogen atom in Formula (II).

The alkynyl group optionally substituted with a halogen atom in Formula (VIII) is preferably an unsubstituted alkynyl group having from 2 to 6 carbon atoms or a halogenated alkynyl group having from 2 to 6 carbon atoms.

The aryl group in Formula (VIII) has the same definition as the aryl group in Formula (II).

The aryl group in Formula (VIII) is preferably a phenyl group, a 4-methylphenyl group, or a 4-fluorophenyl group, more preferably a phenyl group.

In a case in which $R^{18}$ and $R^{21}$ are, and $R^{19}$ and $R^{20}$ are, combined to represent an alkylene group having from 2 to 9 carbon atoms in Formula (VIII), the alkylene group having from 2 to 9 carbon atoms has the same definition as the alkylene group having from 2 to 9 carbon atoms in Formula (II).

The alkylene group having from 2 to 9 carbon atoms in Formula (VIII) is preferably an alkylene group having from 2 to 6 carbon atoms, more preferably an ethylene group.

The alkylene group having from 1 to 4 carbon atoms represented by $R^{22}$ in Formula (VIII) has the same definition as the alkylene group having from 1 to 4 carbon atoms in Formula (V).

The alkylene group having from 1 to 4 carbon atoms represented by $R^{22}$ in Formula (VIII) is preferably a methylene group, a difluoromethylene group, an ethylene group, a fluoroethylene group, or an isopropylene group, more preferably an ethylene group or a fluoroethylene group, still more preferably an ethylene group.

Examples of the compound represented by Formula (VIII) include N,N,N',N'-tetramethyl ethylenediamine, N,N,N',N'-tetraethylethylenediamine, N,N,N',N'-tetramethylpropanediamine, N,N,N',N'-tetraethylpropanediamine, N,N,N',N'-tetramethylhexamethylenediamine, N,N,N',N'-tetraethylhexamethylenediamine, and 1,4-diazabicyclo[2,2,2]octane(triethylenediamine), N,N,N',N'-tetramethylethylenediamine or triethylenediamine is preferable, and triethylenediamine is more preferable.

(Compound Represented by Formula (IX))

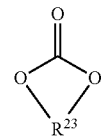

(IX)

In Formula (IX), $R^{23}$ represents an alkylene group having from 2 to 9 carbon atoms, optionally substituted with at least one substituent selected from the group consisting of a halogen atom, an alkyl group optionally substituted with a halogen atom, an alkenyl group optionally substituted with a halogen atom, and an alkynyl group optionally substituted with a halogen atom.

The alkylene group having from 2 to 9 carbon atoms, represented by $R^{23}$, in Formula (IX), has the same definition as the alkylene group having from 2 to 9 carbon atoms in Formula (II).

Examples of the compound represented by Formula (IX) include 1,3-dioxolan-2-one, 4-methyl-1,3-dioxolan-2-one, 4-ethyl-1,3-dioxolan-2-one, 4,4-dimethyl-1,3-dioxolan-2-one, 4,5-dimethyl-1,3-dioxolan-2-one, 4-vinyl-1,3-dioxolan-2-one, 4-ethynyl-1,3-dioxolan-2-one, 4-fluoro-1,3-dioxolan-2-one, and 4,5-difluoro-1,3-dioxolan-2-one, 1,3-dioxolan-2-one, 4-methyl-1,3-dioxolan-2-one, or 4-fluoro-1,3-dioxolan-2-one is preferable, and 1,3-dioxolan-2-one is more preferable.

The compound B is preferably one selected from the group consisting of N-methylpyrrolidone, 1,3-dimethyl-2-imidazolidinone, dimethoxyethane, 1,3-dioxolane, 1,4-dioxane, dimethyl sulfoxide, 1,5,2,4-dioxadithiane-2,2,4,4-tetraoxide, diethyl ether, furan, tetrahydrofuran, triethylamine, pyridine, triethylenediamine, 1,3-dioxolan-2-one, 4-methyl-1,3-dioxolan-2-one, and 4-fluoro-1,3-dioxolan-2-one, more preferably one selected from the group consisting of N-methylpyrrolidone, 1,3-dioxolan-2-one, 4-fluoro-1,3-dioxolan-2-one, diethyl ether, dimethoxyethane, tetrahydrofuran, 1,3-dioxolane, and pyridine.

A preferable aspect of the lithium boron fluorophosphate complex compound of the first embodiment is an aspect where the compound A is one selected from a group of lithium boron fluorophosphates represented by the following Formula (X), and the compound B is one selected from the group consisting of N-methylpyrrolidone, 1,3-dimethyl-2-imidazolidinone, dimethoxyethane, 1,3-dioxolane, 1,4-dioxane, dimethyl sulfoxide, 1,5,2,4-dioxadithiane-2,2,4,4-tetraoxide, diethyl ether, furan, tetrahydrofuran, triethylamine, pyridine, triethylenediamine, 1,3-dioxolan-2-one, 4-methyl-1,3-dioxolan-2-one, and 4-fluoro-1,3-dioxolan-2-one.

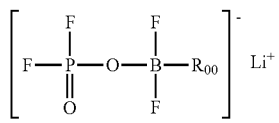
(X)

In Formula (X), $R_{00}$ represents a methyl group, an ethyl group, a propyl group, an isopropyl group, a n-butyl group, an isobutyl group, a vinyl group, an allyl group, an ethynyl group, a phenyl group, or a 4-fluorophenyl group.

A more preferable aspect of the lithium boron fluorophosphate complex compound of the first embodiment is an aspect where the compound A is one selected from the group consisting of lithium boron fluorophosphates represented by the following Formulae (XI) to (XIII), and the compound B is one selected from the group consisting of N-methylpyrrolidone, 1,3-dioxolan-2-one, 4-fluoro-1,3-dioxolan-2-one, diethyl ether, dimethoxyethane, tetrahydrofuran, 1,3-dioxolane, and pyridine.

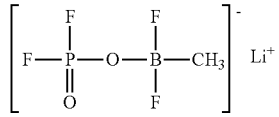
(XI)

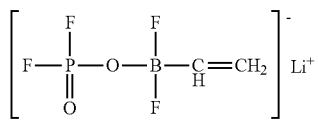
(XII)

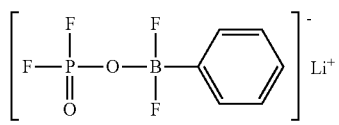
(XIII)

<Preferable Molar Ratio of Compound B to Compound A>

The molar ratio of the compound B to the compound A in the lithium boron fluorophosphate complex compound of the first embodiment (hereinafter, also referred to as "molar ratio [compound B/compound A]") is not particularly limited, and the molar ratio [compound B/compound A] is preferably from 1 to 8, more preferably from 1 to 6.

Specific examples (complex compound (1) to complex compound (24)) of the lithium boron fluorophosphate complex compound of the first embodiment are shown below.

It is noted that the lithium boron fluorophosphate complex compound of the first embodiment is not limited to the following specific examples.

In the complex compound (1) to the complex compound (24), n represents the molar ratio [compound B/compound A]. In the complex compound (1) to the complex compound (24), n is preferably from 1 to 8, more preferably from 1 to 6.

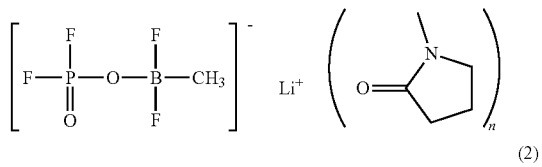
(1)

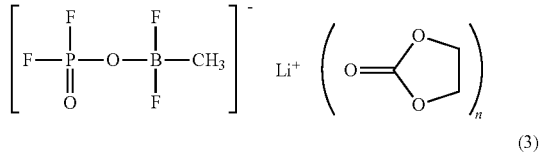
(2)

(3)

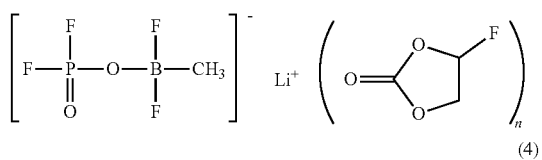
(4)

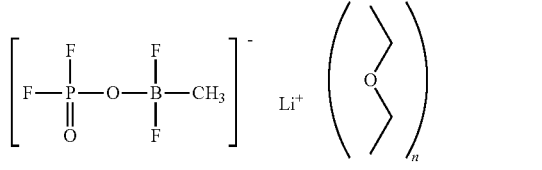
(5)

(6)

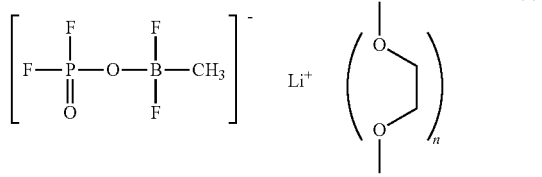
(7)

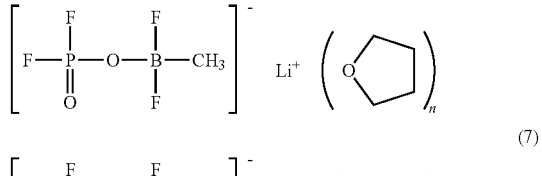
(8)

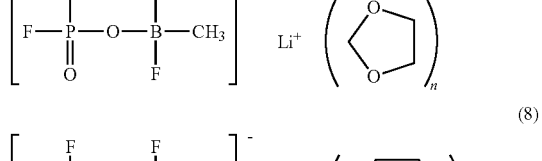
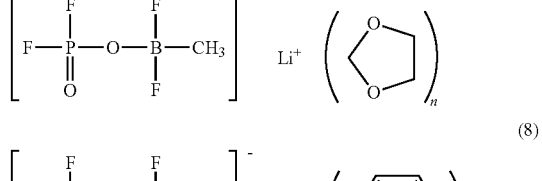
(9)

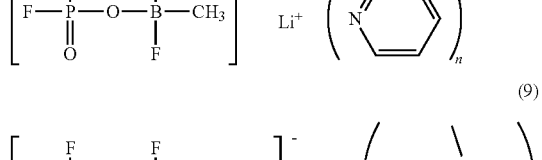
(10)

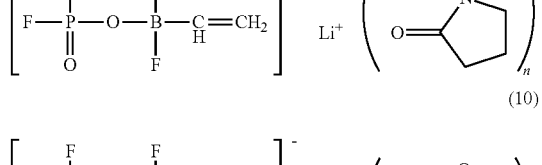

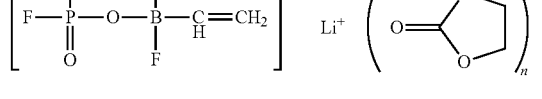

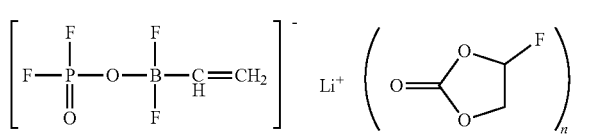
(11)

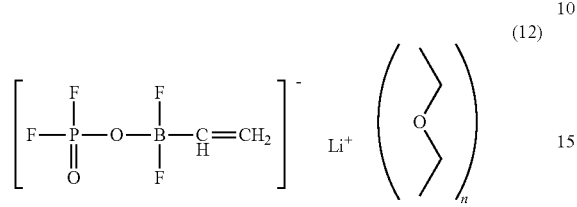
(12)

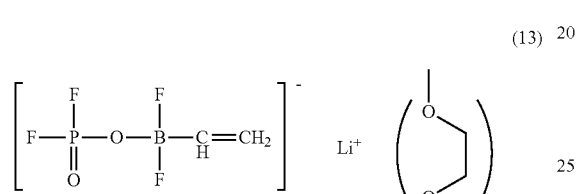
(13)

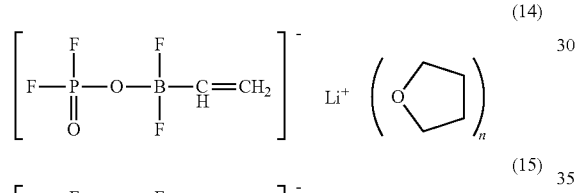
(14)

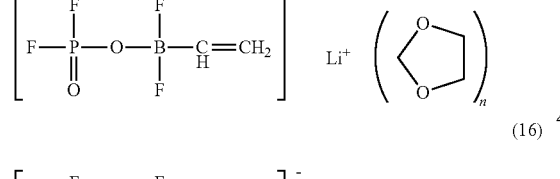
(15)

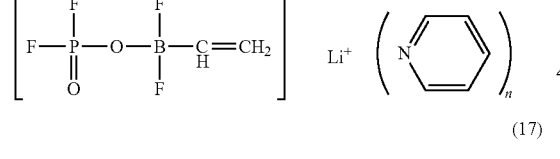
(16)

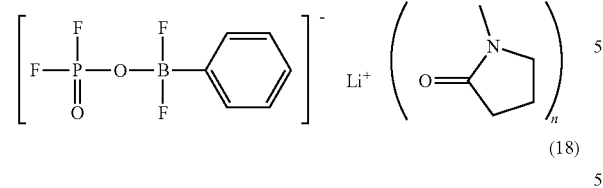
(17)

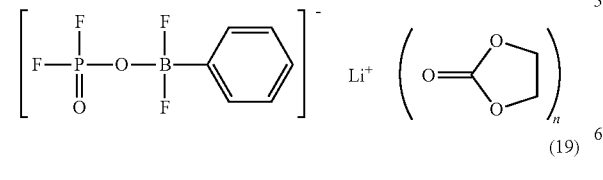
(18)

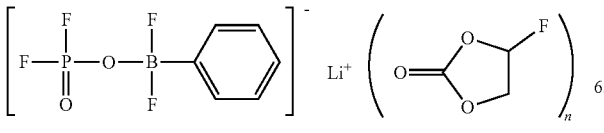
(19)

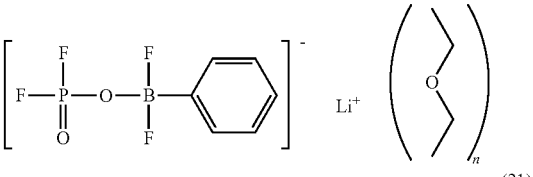
(20)

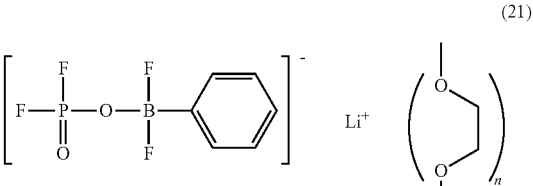
(21)

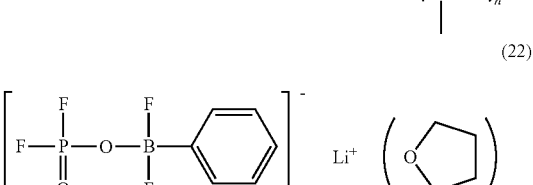
(22)

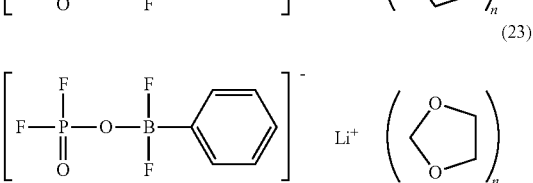
(23)

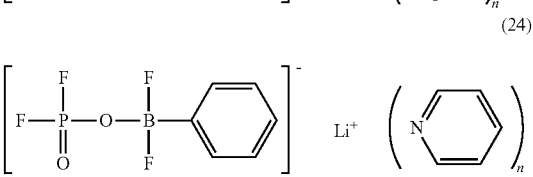
(24)

[One Example of Method of Producing Lithium Boron Fluorophosphate Complex Compound (Production Method X)]

Hereinafter, one example of the method of producing the lithium boron fluorophosphate complex compound of the first embodiment (production method X) is described. It is noted that the method of producing the lithium boron fluorophosphate complex compound of the first embodiment is not limited to the production method X.

The production method X includes a step of reacting raw materials of the compound A in the presence of the compound B (hereinafter, also referred to as "reaction step").

The reaction step in the production method X involves performing a production reaction of the compound A due to a reaction of the raw materials of the compound A, and a formation reaction of the complex compound from the compound A produced and the compound B, and as a result, the lithium boron fluorophosphate complex compound is obtained.

In the reaction step, the compound B may be further added after production of the compound A.

The raw materials of the compound A, to be used, are preferably a lithium fluorophosphate compound and a boroxine compound. In such a case, the lithium fluorophosphate compound and the boroxine compound are reacted to thereby produce the compound A (namely, lithium boron fluorophosphate).

Examples of the lithium fluorophosphate compound include lithium hexafluorophosphate and lithium difluorophosphate. Such a lithium fluorophosphate compound may be used singly or in combination of two or more kinds thereof.

Examples of the boroxine compound include trimethyl boroxine, triethyl boroxine, tributyl boroxine, trioctyl boroxine, trivinyl boroxine, triisopropenyl boroxine, a trivinyl boroxine-pyridine complex, a triisopropenyl boroxine-pyridine complex, triphenyl boroxine, tris(4-methylphenyl) boroxine, tris(3,5-dimethylphenyl) boroxine, tris(4-fluorophenyl) boroxine, and tris(3,5-difluorophenyl) boroxine.

The boroxine compound is preferably trimethyl boroxine, trivinyl boroxine, or triphenyl boroxine.

The ratio of the molar number of the compound B to the molar number of the compound A, calculated based on the molar numbers of the raw materials of the compound A, is preferably from 1 to 8, more preferably from 1 to 6, in the production method X.

In a case in which the ratio of the molar number of the compound B to the molar number of the compound A, calculated based on the molar numbers of the raw materials of the compound A, is 1 or more, a state of an excess of the compound A is easily avoided.

In a case in which the ratio of the molar number of the compound B to the molar number of the compound A, calculated based on the molar numbers of the raw materials of the compound A, is 8 or less, a state of an excess of the compound A is easily avoided.

The reaction step may be a step of reacting the raw materials of the compound A in the presence of the compound B and a solvent.

Examples of the solvent include non-aqueous solvents such as acetone, ethyl acetate, acetonitrile, dimethyl carbonate, ethylmethyl carbonate, diethyl carbonate, hexane, heptane, octane, nonane, decane, toluene, xylene (o-, m-, p-), ethylbenzene, butylbenzene, pentylbenzene, hexylbenzene, heptylbenzene, propylbenzene, isopropylbenzene (cumene), cyclohexylbenzene, tetralin, mesitylene methylcyclopentane, cyclohexane, methylcyclohexane, cycloheptane, cyclooctane, and cyclononane.

The reaction of the raw materials of the compound A in the presence of the compound B may be performed under either normal pressure or reduced pressure.

The reaction of the raw materials of the compound A in the presence of the compound B is preferably performed under an inert atmosphere (for example, under a nitrogen atmosphere or under an argon atmosphere) from the viewpoint that a component (for example, moisture) which inhibits production of the lithium boron fluorophosphate complex compound is prevented from being incorporated.

The reaction temperature of the reaction of the raw materials of the compound A in the presence of the compound B is preferably from 20° C. to 150° C., more preferably from 20° C. to 100° C., still more preferably from 20° C. to 60° C.

When the reaction temperature is 20° C. or more, production of the lithium boron fluorophosphate complex compound is easily promoted.

When the reaction temperature is 150° C. or less, dissociation of the lithium boron fluorophosphate complex compound produced is suppressed and the rate of production is easily enhanced.

The reaction time of the reaction of the raw materials of the compound A in the presence of the compound B is preferably 30 minutes to 12 hours, more preferably 1 hour to 8 hours from the viewpoint that the reaction is allowed to efficiently progress.

The method of taking out the lithium boron fluorophosphate complex compound after the reaction step is not particularly limited.

For example, in a case in which the lithium boron fluorophosphate complex compound is obtained in the form of a solid or liquid including only the objective component, in the reaction step, the compound can be taken out without any special treatment.

In a case in which the lithium boron fluorophosphate complex compound is obtained as a slurry thereof dispersed in a solvent, in the reaction step, the lithium boron fluorophosphate complex compound can be taken out by separating the solvent from the slurry and drying the resultant.

In a case in which the lithium boron fluorophosphate complex compound is obtained as a solution thereof dissolved in a solvent, in the reaction step, the lithium boron fluorophosphate complex compound can be taken out by distilling off the solvent by concentration with heating, or the like.

In a case in which the lithium boron fluorophosphate complex compound is obtained as a solution thereof dissolved in a solvent, in the reaction step, the lithium boron fluorophosphate complex compound can also be taken out by adding a solvent which does not dissolve the lithium boron fluorophosphate complex compound, to the solution to thereby precipitate the lithium boron fluorophosphate complex compound, thereafter separating the solvent from the solution, and drying the resultant.

The method of drying the lithium boron fluorophosphate complex compound taken out, which can be applied, is, for example, a stationary drying method in a compartment tray dryer; a flow drying method in a conical dryer; a drying method by use of an apparatus such as a hot plate or an oven; or a method involving supplying warm air or hot air by a drying machine such as a dryer.

The pressure in drying of the lithium boron fluorophosphate complex compound taken out may be either normal pressure or reduced pressure.

The temperature in drying of the lithium boron fluorophosphate complex compound taken out is preferably from 20° C. to 150° C., more preferably from 20° C. to 100° C., still more preferably from 20° C. to 60° C.

When the temperature is 20° C. or more, an excellent drying efficiency is achieved.

When the temperature is 150° C. or less, dissociation of the lithium boron fluorophosphate complex compound produced is suppressed and the lithium boron fluorophosphate complex compound is easily taken out stably.

The lithium boron fluorophosphate complex compound taken out may be used as it is, or, for example, may be used with being dispersed or dissolved in a solvent or may be used with being mixed with other solid substance.

The lithium boron fluorophosphate complex compound of the first embodiment can be usefully used in applications such as an additive for a lithium battery (preferably an additive for a lithium secondary battery, more preferably an additive for a non-aqueous electrolytic solution of a lithium secondary battery), a reaction reagent, a synthetic reaction catalyst, an electrolyte for various electrochemical devices, a doping agent, and an additive for a lubricating oil.

[Lithium Boron Fluorophosphate Complex Compound of Second Embodiment]

A lithium boron fluorophosphate complex compound of a second embodiment in the disclosure is a lithium boron fluorophosphate complex compound including at least one compound A selected from a group of lithium boron fluorophosphates represented by Formula (I).

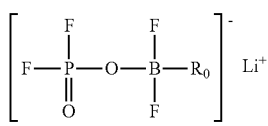

(I)

In Formula (I), $R_0$ represents a hydrocarbon group having from 1 to 20 carbon atoms.

The lithium boron fluorophosphate complex compound of the first embodiment is encompassed in the concept of the lithium boron fluorophosphate complex compound of the second embodiment.

The lithium boron fluorophosphate complex compound of the second embodiment and also a preferable aspect thereof are the same as the lithium boron fluorophosphate complex compound of the first embodiment and a preferable aspect thereof, respectively, except that the compound is not limited to include the compound B and may include two or more kinds of the compounds A.

The lithium boron fluorophosphate complex compound of the second embodiment does not exhibit any melting point and boiling point of a single compound A included in the lithium boron fluorophosphate complex compound of the second embodiment, and exhibits an endothermic thermal dissociation behavior at a temperature not observed with respect to such a single compound A.

That is, the lithium boron fluorophosphate complex compound of the second embodiment is a novel compound different in thermophysical properties from such a single compound A.

The lithium boron fluorophosphate complex compound of the second embodiment is a complex compound including at least one compound A as a lithium boron fluorophosphate, and also is a complex compound where two fluorine atoms and one $R_0$ (namely, a hydrocarbon group having from 1 to 20 carbon atoms) are bonded to a boron atom in the compound A. From such a viewpoint, the lithium boron fluorophosphate complex compound of the second embodiment is different from $LiBF_3(PO_2F_2)$ described in Patent Document 4 above, which is not a complex compound and in which three fluorine atoms are bonded to a boron atom in the compound.

A preferable aspect of the lithium boron fluorophosphate represented by Formula (I) in the lithium boron fluorophosphate complex compound of the second embodiment is the same as a preferable aspect of the lithium boron fluorophosphate represented by Formula (I) in the lithium boron fluorophosphate complex compound of the first embodiment.

[Lithium Boron Fluorophosphate-Containing Composition]

The lithium boron fluorophosphate-containing composition of the disclosure includes at least one compound A selected from a group of lithium boron fluorophosphates represented by Formula (I).

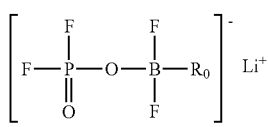

(I)

In Formula (I), $R_0$ represents a hydrocarbon group having from 1 to 20 carbon atoms.

The lithium boron fluorophosphate represented by Formula (I) included in the lithium boron fluorophosphate-containing composition of the disclosure is different from $LiBF_3(PO_2F_2)$ described in Patent Document 4 above, in which three fluorine atoms are bonded to a boron atom in the compound, from the viewpoint that the fluorophosphate is a compound where two fluorine atoms and one $R_0$ (namely, a hydrocarbon group having from 1 to 20 carbon atoms) are bonded to a boron atom.

A preferable aspect of the lithium boron fluorophosphate represented by Formula (I) included in the lithium boron fluorophosphate-containing composition of the disclosure is the same as a preferable aspect of the lithium boron fluorophosphate represented by Formula (I) in each of the lithium boron fluorophosphate complex compounds of the first embodiment and the second embodiment.

The lithium boron fluorophosphate-containing composition of the disclosure may be a composition including at least one lithium boron fluorophosphate (compound A) represented by Formula (I), and is not particularly limited in terms of others.

For example, the non-aqueous electrolytic solution for a battery of the disclosure, described below, is encompassed in the concept of the lithium boron fluorophosphate-containing composition of the disclosure.

[Lithium Boron Fluorophosphate]

The lithium boron fluorophosphate of the disclosure is a lithium boron fluorophosphate represented by Formula (I).

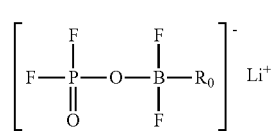

(I)

In Formula (I), $R_0$ represents a hydrocarbon group having from 1 to 20 carbon atoms.

The lithium boron fluorophosphate of the disclosure (namely, the lithium boron fluorophosphate represented by Formula (I)) is different from $LiBF_3(PO_2F_2)$ described in Patent Document 4 above, in which three fluorine atoms are bonded to a boron atom in the compound, from the viewpoint that the fluorophosphate is a compound where two fluorine atoms and one $R_0$ (namely, a hydrocarbon group having from 1 to 20 carbon atoms) are bonded to a boron atom.

A preferable aspect of the lithium boron fluorophosphate of the disclosure (namely, the lithium boron fluorophosphate represented by Formula (I)) is the same as a preferable aspect of the lithium boron fluorophosphate represented by Formula (I) in each of the lithium boron fluorophosphate complex compounds of the first embodiment and the second embodiment.

[Additive for Lithium Secondary Battery]

The additive for a secondary battery of the disclosure includes at least one of the lithium boron fluorophosphate complex compound of the disclosure (namely, the lithium boron fluorophosphate complex compound of first embodiment or the second embodiment) or the lithium boron fluorophosphate of the disclosure.

The additive for a secondary battery of the disclosure is particularly suitable as an additive for a non-aqueous electrolytic solution of a lithium secondary battery.

[Non-Aqueous Electrolytic Solution for Battery]

The non-aqueous electrolytic solution for a battery of the disclosure (hereinafter, also simply referred to as "non-aqueous electrolytic solution") includes at least one of the lithium boron fluorophosphate complex compound of the disclosure (namely, the lithium boron fluorophosphate complex compound of first embodiment or the second embodiment) or the lithium boron fluorophosphate of the disclosure.

The non-aqueous electrolytic solution of the disclosure includes at least one of the lithium boron fluorophosphate complex compound of the disclosure or the lithium boron fluorophosphate of the disclosure, and thus can reduce battery resistance.

The non-aqueous electrolytic solution of the disclosure enables a high discharge capacity of a battery to be maintained.

The non-aqueous electrolytic solution of the disclosure is excellent in the effect of enabling a high discharge capacity of a battery after high-temperature storage to be maintained, as compared with a non-aqueous electrolytic solution containing $LiBF_3(PO_2F_2)$ described in Patent Document 4 above.

The non-aqueous electrolytic solution of the disclosure is excellent in the effect of enabling a high discharge capacity retention rate (in detail, the ratio of the discharge capacity at a discharge rate of 2 C with respect to the discharge capacity at a discharge rate of 0.2 C) of a battery after high-temperature storage to be maintained, as compared with a non-aqueous electrolytic solution containing $LiBF_3(PO_2F_2)$ described in Patent Document 4 above.

In a case in which the non-aqueous electrolytic solution of the disclosure contains the lithium boron fluorophosphate complex compound of the disclosure, the lithium boron fluorophosphate complex compound may be contained singly or in combination of two or more kinds thereof, in the non-aqueous electrolytic solution of the disclosure.

The content of the lithium boron fluorophosphate complex compound in the non-aqueous electrolytic solution of the disclosure (total content in the case of two or more kinds) is preferably from 0.001% by mass to 10% by mass, more preferably from 0.01% by mass to 10% by mass, still more preferably from 0.05% by mass to 5% by mass, still more preferably from 0.1% by mass to 5% by mass, still more preferably from 0.4% by mass to 5% by mass, still more preferably from 0.5% by mass to 5% by mass, still more preferably from 0.5% by mass to 3% by mass, still more preferably from 0.5% by mass to 2% by mass, with respect to the total amount of the non-aqueous electrolytic solution.

In a case in which the non-aqueous electrolytic solution of the disclosure contains the lithium boron fluorophosphate of the disclosure, the lithium boron fluorophosphate may be contained singly or in combination of two or more kinds thereof, in the non-aqueous electrolytic solution of the disclosure.

The content of the lithium boron fluorophosphate in the non-aqueous electrolytic solution of the disclosure (total content in the case of two or more kinds) is preferably from 0.001% by mass to 10% by mass, more preferably from 0.01% by mass to 10% by mass, still more preferably from 0.05% by mass to 5% by mass, still more preferably from 0.1% by mass to 5% by mass, still more preferably from 0.4% by mass to 5% by mass, still more preferably from 0.5% by mass to 5% by mass, still more preferably from 0.5% by mass to 3% by mass, still more preferably from 0.5% by mass to 2% by mass, with respect to the total amount of the non-aqueous electrolytic solution.

Even in a case in which a non-aqueous electrolytic solution collected by actually disassembling a battery is analyzed, the amount(s) of the lithium boron fluorophosphate complex compound and/or the lithium boron fluorophosphate may be decreased as compared with the amount(s) thereof added to the non-aqueous electrolytic solution. Accordingly, in a case in which the lithium boron fluorophosphate complex compound and/or the lithium boron fluorophosphate can be detected even in small amount(s), in such a non-aqueous electrolytic solution taken out from a battery, such a non-aqueous electrolytic solution is encompassed in the non-aqueous electrolytic solution of the disclosure.

Even in a case in which the lithium boron fluorophosphate complex compound and/or the lithium boron fluorophosphate cannot be detected in such a non-aqueous electrolytic solution, a case in which a compound derived from any decomposed product of the lithium boron fluorophosphate complex compound and/or the lithium boron fluorophosphate is detected in such a non-aqueous electrolytic solution or a coating film of an electrode is also considered to be encompassed within the scope of the non-aqueous electrolytic solution of the disclosure.

Such consideration of encompassing is also similarly applied to any compound other than the lithium boron fluorophosphate complex compound and the lithium boron fluorophosphate which can be contained in such a non-aqueous electrolytic solution.

Next, any other component of the non-aqueous electrolytic solution is described.

The non-aqueous electrolytic solution generally contains a non-aqueous solvent.

<Non-Aqueous Solvent>

Any of various known non-aqueous solvents can be appropriately selected as the non-aqueous solvent, and at least one selected from a cyclic aprotic solvent or a linear aprotic solvent is preferably used.

In a case in which an enhancement in flash point of the solvent is aimed for the purpose of an enhancement in safety of a battery, a cyclic aprotic solvent is preferably used as the non-aqueous solvent.

(Cyclic Aprotic Solvent)

The cyclic aprotic solvent to be used can be cyclic carbonate, cyclic carboxylate, cyclic sulfone, or cyclic ether.

The cyclic aprotic solvent may be used singly or in mixture of a plurality of kinds thereof.

The mixing ratio of the cyclic aprotic solvent in the non-aqueous solvent is 10% by mass to 100% by mass, still more preferably 20% by mass to 90% by mass, particularly preferably 30% by mass to 80% by mass. When such a ratio is adopted, the conductivity of an electrolytic solution relating to battery charge/discharge characteristics can be enhanced.

Specific examples of the cyclic carbonate include ethylene carbonate, propylene carbonate, 1,2-butylene carbonate, 2,3-butylene carbonate, 1,2-pentylene carbonate, and 2,3-pentylene carbonate. In particular, ethylene carbonate or propylene carbonate high in permittivity is suitably used. Ethylene carbonate is more preferably used in a battery where graphite is used for a negative electrode active material. Such cyclic carbonate may be used in mixture of two or more kinds thereof.

Specific examples of the cyclic carboxylate can include γ-butyrolactone, δ-valerolactone, or an alkyl-substituted product such as methyl γ-butyrolactone, ethyl γ-butyrolactone, or ethyl δ-valerolactone.

The cyclic carboxylate is low in vapor pressure, low in viscosity, and high in permittivity, and can decrease the viscosity of an electrolytic solution without any decreases in flash point of such an electrolytic solution and in the degree of dissociation of an electrolyte. Thus, the cyclic carboxylate is preferably used as the cyclic aprotic solvent in a case in which an enhancement in flash point of the solvent is directed, because the cyclic carboxylate has the characteristics of enabling the conductivity of an electrolytic solution, as an index involving in battery discharge characteristics, to be enhanced without any increase in flammability of an electrolytic solution. The cyclic carboxylate is most preferably γ-butyrolactone.

The cyclic carboxylate is preferably used as a mixture with other cyclic aprotic solvent. Examples include a mixture of the cyclic carboxylate and the cyclic carbonate and/or the linear carbonate.

Examples of the cyclic sulfone include sulfolane, 2-methylsulfolane, 3-methylsulfolane, dimethylsulfone, diethylsulfone, dipropylsulfone, methylethylsulfone, and methylpropylsulfone.

Examples of the cyclic ether can include dioxolane.

(Linear Aprotic Solvent)

The linear aprotic solvent to be used can be, for example, linear carbonate, linear carboxylate, linear ether, or linear phosphate.

The mixing ratio of the linear aprotic solvent in the non-aqueous solvent is 10% by mass to 100% by mass, still more preferably 20% by mass to 90% by mass, particularly preferably 30% by mass to 80% by mass.

Specific examples of the linear carbonate include dimethyl carbonate, methylethyl carbonate, diethyl carbonate, methylpropyl carbonate, methylisopropyl carbonate, ethylpropyl carbonate, dipropyl carbonate, methylbutyl carbonate, ethylbutyl carbonate, dibutyl carbonate, methylpentyl carbonate, ethylpentyl carbonate, dipentyl carbonate, methylheptyl carbonate, ethylheptyl carbonate, diheptyl carbonate, methylhexyl carbonate, ethylhexyl carbonate, dihexyl carbonate, methyloctyl carbonate, ethyloctyl carbonate, dioctyl carbonate, and methyltrifluoroethyl carbonate. Such linear carbonate may be used in mixture of two or more kinds thereof.

Specific examples of the linear carboxylate include methyl pivalate.

Specific examples of the linear ether include dimethoxyethane.

Specific examples of the linear phosphate include trimethyl phosphate.

(Combination of Solvents)

The non-aqueous solvent for use in the non-aqueous electrolytic solution of the disclosure may be used singly or in mixture of two or more kinds thereof. Alternatively, only the cyclic aprotic solvent may be used singly or in mixture of two or more kinds thereof, only the linear aprotic solvent may be used singly or in mixture of two or more kinds thereof, or the cyclic aprotic solvent and the linear protic solvent may be mixed and used. The cyclic aprotic solvent and the linear aprotic solvent are preferably used in combination as the non-aqueous solvent in a case in which enhancements in load characteristics and low-temperature characteristics of a battery are particularly aimed.

The cyclic carbonate and the linear carbonate are most preferably applied to the cyclic aprotic solvent and the linear aprotic solvent, respectively, in terms of electrochemical stability of an electrolytic solution. A combination of the cyclic carboxylate and the cyclic carbonate and/or the linear carbonate can also enhance conductivity of an electrolytic solution relating to battery charge/discharge characteristics.

Specific examples of the combination of the cyclic carbonate and the linear carbonate include each combination of ethylene carbonate and dimethyl carbonate, ethylene carbonate and methylethyl carbonate, ethylene carbonate and diethyl carbonate, propylene carbonate and dimethyl carbonate, propylene carbonate and methylethyl carbonate, propylene carbonate and diethyl carbonate, ethylene carbonate, propylene carbonate, and methylethyl carbonate, ethylene carbonate, propylene carbonate, and diethyl carbonate, ethylene carbonate, dimethyl carbonate, and methylethyl carbonate, ethylene carbonate, dimethyl carbonate, and diethyl carbonate, ethylene carbonate, methylethyl carbonate, and diethyl carbonate, ethylene carbonate, dimethyl carbonate, methylethyl carbonate, and diethyl carbonate, ethylene carbonate, propylene carbonate, dimethyl carbonate, and methylethyl carbonate, ethylene carbonate, propylene carbonate, dimethyl carbonate, and diethyl carbonate, ethylene carbonate, propylene carbonate, methylethyl carbonate, and diethyl carbonate, and ethylene carbonate, propylene carbonate, dimethyl carbonate, methylethyl carbonate, and diethyl carbonate.

The mixing ratio between the cyclic carbonate and the linear carbonate, expressed by the mass ratio, is 5:95 to 80:20, still more preferably 10:90 to 70:30, particularly preferably 15:85 to 55:45 as cyclic carbonate:linear carbonate. When such a ratio can be adopted, not only an increase in viscosity of an electrolytic solution can be suppressed and the degree of dissociation of an electrolyte can be enhanced, and thus the conductivity of an electrolytic solution relating to battery charge/discharge characteristics can be enhanced, but also the solubility of an electrolyte can be further enhanced. Therefore, an electrolytic solution excellent in electric conductivity at ordinary temperature or low temperature can be obtained, and thus load characteristics of a battery at any temperature ranging from ordinary temperature to low temperature can be improved.

Specific examples of the combination of the cyclic carboxylate and the cyclic carbonate and/or the linear carbonate include each combination of γ-butyrolactone and ethylene carbonate, γ-butyrolactone, ethylene carbonate, and dimethyl carbonate, γ-butyrolactone, ethylene carbonate, and methylethyl carbonate, γ-butyrolactone, ethylene carbonate, and diethyl carbonate, γ-butyrolactone and propylene carbonate, γ-butyrolactone, propylene carbonate, and dimethyl carbonate, γ-butyrolactone, propylene carbonate, and methylethyl carbonate, γ-butyrolactone, propylene carbonate, and diethyl carbonate, γ-butyrolactone, ethylene carbonate, and propylene carbonate, γ-butyrolactone, ethylene carbonate, propylene carbonate, and dimethyl carbonate, γ-butyrolactone, ethylene carbonate, propylene carbonate, and methylethyl carbonate, γ-butyrolactone, ethylene carbonate, propylene carbonate, and diethyl carbonate, γ-butyrolactone, ethylene carbonate, dimethyl carbonate, and methylethyl carbonate, γ-butyrolactone, ethylene carbonate, dimethyl carbonate, and diethyl carbonate, γ-butyrolactone, ethylene carbonate, methylethyl carbonate, and diethyl carbonate, γ-butyrolactone, ethylene carbonate, dimethyl carbonate, methylethyl carbonate, and diethyl carbonate, γ-butyrolactone, ethylene carbonate, propylene carbonate, dimethyl carbonate, and methylethyl carbonate, γ-butyrolactone, ethylene carbonate, propylene carbonate, dimethyl carbonate, and diethyl carbonate, γ-butyrolactone, ethylene carbonate, propylene carbonate, methylethyl carbonate, and diethyl carbonate, γ-butyrolactone, ethylene carbonate, pro-
pylene carbonate, dimethyl carbonate, methylethyl carbonate, and diethyl carbonate, γ-butyrolactone and sulfolane, γ-butyrolactone, ethylene carbonate, and sulfolane, γ-butyrolactone, propylene carbonate, and sulfolane, γ-butyrolactone, ethylene carbonate, propylene carbonate, and sulfolane, and γ-butyrolactone, sulfolane, and dimethyl carbonate.

(Other Solvent)

Examples of the non-aqueous solvent include any solvent other than the above.

Specific examples of such any other solvent include amide such as dimethylformamide, linear carbamate such as methyl-N,N-dimethyl carbamate, cyclic amide such as N-methylpyrrolidone, cyclic urea such as N,N-dimethylimidazolidinone, a boron compound such as trimethyl borate, triethyl borate, tributyl borate, trioctyl borate, or trimethylsilyl borate, and any polyethylene glycol derivative represented by the following Formulae.

$$HO(CH_2CH_2O)_aH$$

$$HO[CH_2CH(CH_3)O]_bH$$

$$CH_3O(CH_2CH_2O)_cH$$

$$CH_3O[CH_2CH(CH_3)O]_dH$$

$$CH_3O(CH_2CH_2O)_eCH_3$$

$$CH_3O[CH_2CH(CH_3)O]_fCH_3$$

$$C_9H_{19}PhO(CH_2CH_2O)_g[CH(CH_3)O]_hCH_3$$

(Ph represents a phenyl group)

$$CH_3O[CH_2CH(CH_3)O]_iCO[OCH(CH_3)CH_2]_jOCH_3$$

In Formulae, from a to f are each an integer of from 5 to 250, from g to j are each an integer of from 2 to 249, and $5 \leq g+h \leq 250$ and $5 \leq i+j \leq 250$ are satisfied.

<Electrolyte>

The non-aqueous electrolytic solution of the disclosure may include any of various known electrolytes. Such an electrolyte to be used can be any one commonly used as an electrolyte for a non-aqueous electrolytic solution. The electrolyte is preferably a lithium salt.

Specific examples of the lithium salt include $LiPF_6$, $LiBF_4$, $LiClO_4$, $LiAsF_6$ $Li_2SiF_6$, $LiOSO_2C_kF_{(2k+1)}$ (k=an integer of from 1 to 8), $LiN(SO_2F)_2$, $LiN(SO_2C_kF_{(2k+1)})_2$ (k=an integer of from 1 to 8), $LiPF_n(C_kF_{(2k+1)})_{(6-n)}$ (n=an integer of from 1 to 5, k=an integer of from 1 to 8), $LiBF_nC_kF_{(2k+1)}$ (n=an integer of from 1 to 3, k=an integer of from 1 to 8), $LiB(C_2O_4)_2$ (lithium bisoxalylborate), $LiBF_2(C_2O_4)$ (lithium difluorooxalylborate), and $LiPF_3(C_2O_4)$ (lithium trifluorooxalylphosphate); and any lithium salt represented by the following Formulae.

$$LiC(SO_2R^{11})(SO_2R^{12})(SO_2R^{13})$$

$$LiN(SO_2OR^{14})(SO_2OR^{15})$$

$$LiN(SO_2R^{16})(SO_2R^{17})$$

In Formulae, $R^{11}$ to $R^{17}$ each represent a perfluoroalkyl group having from 1 to 8 carbon atoms. $R^{11}$ to $R^{13}$ may be the same as or different from one another. $R^{14}$ and $R^{15}$ may be the same as or different from each other. $R^{16}$ and $R^{17}$ may be the same as or different from each other.

The lithium salt is preferably $LiPF_6$, $LiBF_4$, or $LiN(SO_2C_kF_{(2k+1)})_2$ (k=an integer of from 1 to 8).

The concentration of the lithium salt of the non-aqueous electrolytic solution of the disclosure is preferably 0.1 mol/L to 3 mol/L, more preferably 0.5 mol/L to 2 mol/L.

The lithium salt may be used singly or in mixture of two or more kinds thereof.

The non-aqueous electrolytic solution of the disclosure may further contain an additive C which is a compound represented by the following Formula (C).

(C)

In Formula (C), $R^{c1}$ and $R^{c2}$ each independently represent a hydrogen atom, a methyl group, an ethyl group, or a propyl group.

In Formula (C), $R^{c1}$ and $R^{c2}$ each independently represent a hydrogen atom, a methyl group, an ethyl group, or a propyl group.

Examples of the compound represented by Formula (C) include vinylene carbonate, methylvinylene carbonate, ethylvinylene carbonate, propylvinylene carbonate, dimethylvinylene carbonate, diethylvinylene carbonate, and dipropylvinylene carbonate.

In particular, vinylene carbonate (a compound where both $R^{c1}$ and $R^{c2}$ in Formula (C) are hydrogen atoms) is particularly preferable.

In a case in which the non-aqueous electrolytic solution of the disclosure contains the additive C, the content of the additive C (total content in a case in which the additive C is a compound of two or more kinds thereof) is preferably from 0.001% by mass to 10% by mass, more preferably from 0.001% by mass to 5% by mass, still more preferably from 0.001% by mass to 3% by mass, still more preferably from 0.01% by mass to 5% by mass, still more preferably from 0.1 to 3% by mass, with respect to the total amount of the non-aqueous electrolytic solution.

The non-aqueous electrolytic solution of the disclosure not only is suitable as a non-aqueous electrolytic solution for a battery, but also can be used as a non-aqueous electrolytic solution for a primary battery or a secondary battery, a non-aqueous electrolytic solution for an electrochemical capacitor, or an electrolytic solution for an electric double layer capacitor or an aluminum electrolytic capacitor.

[Lithium Secondary Battery]

The lithium secondary battery of the disclosure includes a positive electrode, a negative electrode, and the non-aqueous electrolytic solution of the disclosure.

The lithium secondary battery of the disclosure includes the non-aqueous electrolytic solution of the disclosure and thus is reduced in battery resistance.

(Negative Electrode)

The negative electrode may include a negative electrode active material and a negative electrode current collector.

The negative electrode active material in the negative electrode, to be used, can be at least one (which may be used singly or in mixture of two or more kinds thereof) selected from the group consisting of metallic lithium, a lithium-containing alloy, a metal or alloy capable of alloying with lithium, an oxide capable of doping and dedoping a lithium ion, a transition metal nitride capable of doping and dedoping a lithium ion, and a carbon material capable of doping and dedoping a lithium ion.

Examples of the metal or alloy capable of alloying with lithium (or a lithium ion) can include silicon, a silicon alloy, tin, and a tin alloy. Lithium titanate may also be adopted.

In particular, the carbon material capable of doping and dedoping a lithium ion is preferable. Examples of such a carbon material include carbon black, activated carbon, a graphite material (artificial graphite or natural graphite), and an amorphous carbon material. The form of the carbon material may be any of fibrous, spherical, potato-shaped, and flake-shaped forms.

Specific examples of the amorphous carbon material include hard carbon, coke, and mesocarbon microbead (MCMB) and mesophase pitch carbon fiber (MCF) fired at 1500° C. or less.

Examples of the graphite material include natural graphite and artificial graphite. The artificial graphite to be used is MCMB graphite, MCF graphite, or the like. The graphite material to be used can also be any graphite material containing boron. The graphite material to be used can also be any graphite material covered with a metal such as gold, platinum, silver, copper, or tin, any graphite material covered with amorphous carbon, or a mixture of amorphous carbon and graphite.

Such a carbon material may be used singly or in mixture of two or more kinds thereof. The carbon material is particularly preferably a carbon material where the face interval d(002) of the (002) plane, measured by X-ray analysis, is 0.340 nm or less. The carbon material is also preferably graphite having a true density of 1.70 g/cm$^3$ or more or a highly crystalline carbon material having the property close thereto. The carbon material above can be used to thereby more enhance the energy density of a battery.

The material of the negative electrode current collector in the negative electrode is not particularly limited, and a known material can be arbitrarily used.

Specific examples of the negative electrode current collector include metal materials such as copper, nickel, stainless steel, and nickel-plated steel. In particular, copper is preferable from the viewpoint of ease of processing.

(Positive Electrode)

The positive electrode may include a positive electrode active material and a positive electrode current collector.

Examples of the positive electrode active material in the positive electrode include transition metal oxide or transition metal sulfide, such as $MoS_2$, $TiS_2$, $MnO_2$, and $V_2O_5$, $LiCoO_2$, $LiMnO_2$, $LiMn_2O_4$, $LiNiO_2$, $LiNi_xCo_{(1-x)}O_2$ [0<X<1], $Li_{1+\alpha}Me_{1-\alpha}O_2$ having an α-NaFeO$_2$-type crystal structure (Me represents a transition metal element including Mn, Ni, or Co, $1.0 \leq (1+\alpha)/(1-\alpha) \leq 1.6$), $LiNi_xCo_yMn_zO_2$ [x+y+z=1, 0<x<1, 0<y<1, 0<z<1] (for example, $LiNi_{0.33}Co_{0.33}Mn_{0.33}O_2$ or $LiNi_{0.5}Co_{0.2}Mn_{0.3}O_2$), composite oxides made of lithium and a transition metal, such as $LiFePO_4$ and $LiMnPO_4$, and conductive polymer materials such as polyaniline, polythiophene, polypyrrole, polyacetylene, polyacene, dimercaptothiadiazole, and a polyaniline composite. In particular, a composite oxide made of lithium and a transition metal is particularly preferable. In a case in which the negative electrode is metallic lithium or a lithium alloy, the positive electrode to be used can also be a carbon material. The positive electrode to be used can also be a mixture of a composite oxide of lithium and a transition metal with a carbon material.

The positive electrode active material may be used singly or in mixture of two or more kinds thereof. The positive electrode active material can be used together with a conductive aid to thereby form a positive electrode, in the case of being insufficient in conductivity. Examples of the conductive aid can include carbon materials such as carbon black, an amorphous whisker, and graphite.

The material of the positive electrode current collector in the positive electrode is not particularly limited, and a known material can be arbitrarily used.

Specific examples of the positive electrode current collector include metal materials such as aluminum, an aluminum alloy, stainless steel, nickel, titanium, and tantalum; and carbon materials such as a carbon cloth and carbon paper.

(Separator)

The lithium secondary battery of the disclosure preferably includes a separator between the negative electrode and the positive electrode.

The separator is a membrane which electrically insulates the positive electrode and the negative electrode and through which a lithium ion penetrates, and examples thereof include a porous membrane and a polymer electrolyte.

The porous membrane to be used is suitably a microporous polymer film, and examples of a material include polyolefin, polyimide, polyvinylidene fluoride, and polyester.

A porous polyolefin film is preferable, and specific examples can include a porous polyethylene film, a porous polypropylene film, or a multilayer film of a porous polyethylene film and a polypropylene film. Such a porous polyolefin film may also be coated with other resin excellent in thermal stability.

Examples of the polymer electrolyte include a polymer in which a lithium salt is dissolved and a polymer swollen by an electrolytic solution.

The non-aqueous electrolytic solution of the disclosure may also be used for the purpose of providing the polymer electrolyte by swelling of a polymer.

(Configuration of Battery)

The lithium secondary battery of the disclosure can have any of various known shapes, and can be formed so as to have any shape of a cylinder-type, coin-type, square-type, laminate-type, film-type, and the like.

The battery has the same basic structure regardless of the shape, and can be varied in design depending on the intended use.

Examples of the lithium secondary battery of the disclosure include a laminate-type battery.

Figure 2:
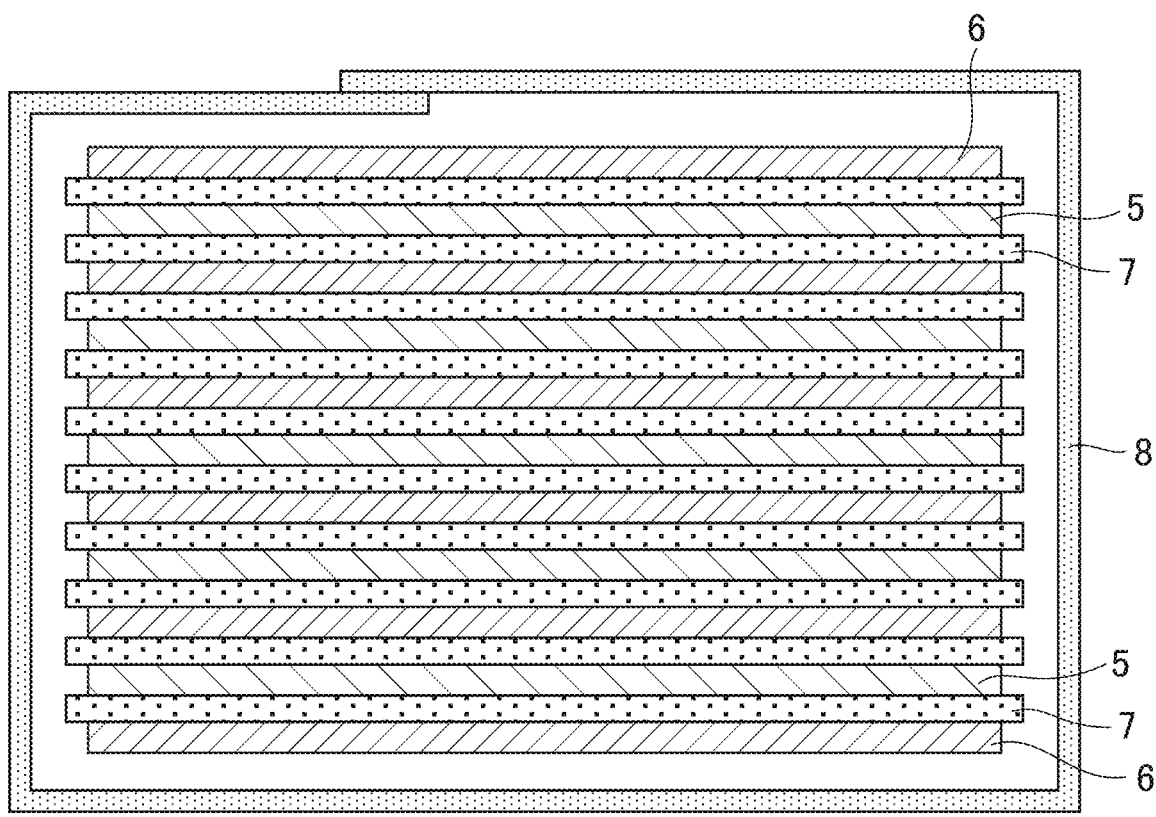
FIG. 2 is a schematic cross-sectional view in a thickness direction, of a layered electrode body to be accommodated in the laminate-type battery illustrated in FIG. 1.

FIG. 1 is a schematic perspective view illustrating one example of a laminate-type battery as one example of the lithium secondary battery of the disclosure, and FIG. 2 is a schematic cross-sectional view in a thickness direction, of a layered electrode body to be accommodated in the laminate-type battery illustrated in FIG. 1.

A laminate-type battery illustrated in FIG. 1 includes a laminate outer package 1 where a non-aqueous electrolytic solution (not illustrated in FIG. 1) and a layered electrode body (not illustrated in FIG. 1) are accommodated inside and a peripheral edge portion is sealed to thereby allow the interior to be encapsulated. The laminate outer package 1 to be used is, for example, a laminate outer package made of aluminum.

The layered electrode body accommodated in the laminate outer package 1 includes a laminated body obtained by alternately layering a positive electrode plate 5 and a negative electrode plate 6 with a separator 7 being interposed therebetween, and a separator 8 surrounding the periphery of the laminated body, as illustrated in FIG. 2. The positive electrode plate 5, the negative electrode plate 6, the separator 7, and the separator 8 are each impregnated with the non-aqueous electrolytic solution of the disclosure.

Each of a plurality of the positive electrode plates 5 in the layered electrode body is electrically connected (not illustrated) to the positive electrode terminal 2 via a positive electrode tab, and the positive electrode terminal 2 is partially protruded outward from the peripheral end portion of the laminate outer package 1 (FIG. 1). A portion of the peripheral end portion of the laminate outer package 1, where the positive electrode terminal 2 is protruded, is sealed by an insulation seal 4.

Similarly, each of a plurality of the negative electrode plates 6 in the layered electrode body is electrically connected (not illustrated) to the negative electrode terminal 3 via a negative electrode tab, and the negative electrode terminal 3 is partially protruded outward from the peripheral end portion of the laminate outer package 1 (FIG. 1). A portion of the peripheral end portion of the laminate outer package 1, where the negative electrode terminal 3 is protruded, is sealed by an insulation seal 4.

The laminate-type battery according to such one example includes five positive electrode plates 5 and six negative electrode plates 6, and has a configuration where each of the positive electrode plates 5 and each of the negative electrode plates 6 are layered with the separator 7 being interposed therebetween so that both the outermost layers are the negative electrode plates 6.

However, it goes without saying that the number of the positive electrode plates, the number of the negative electrode plates, and the configuration of the laminate-type battery are not limited to such one example and various modifications may be made. For example, the layered electrode body to be accommodated in the laminate outer package 1 may be a layered electrode body where one positive electrode plate 5 and one negative electrode plate 6 are layered with one separator 7 being interposed therebetween.

Another example of the lithium secondary battery of the disclosure includes a coin-type battery.

Figure 3:
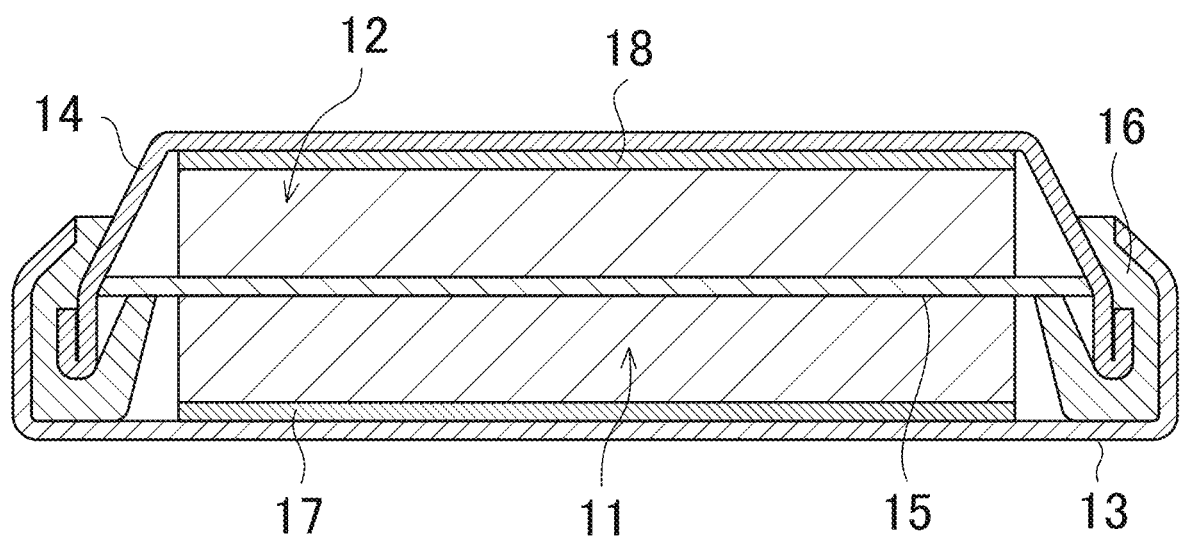
FIG. 3 is a schematic cross-sectional view illustrating one example of a coin-type battery as another example of the lithium secondary battery of the disclosure.

FIG. 3 is a schematic perspective view illustrating one example of a coin-type battery as another example of the lithium secondary battery of the disclosure.

A coin-type battery illustrated in FIG. 3 has a configuration where a disk-shaped negative electrode 12, a separator 15 to which a non-aqueous electrolytic solution is injected, a disk-shaped positive electrode 11, and, if necessary, spacer plates 17 and 18 of stainless steel, aluminum, or the like are layered in the listed order and accommodated between a positive electrode can 13 (hereinafter, also referred to as "battery can") and an opening sealing plate 14 (hereinafter, also referred to as "battery can lid"). The positive electrode can 13 and the opening sealing plate 14 are hermetically enclosed by swaging via a gasket 16.

The non-aqueous electrolytic solution of the disclosure can be used as the non-aqueous electrolytic solution to be injected to the separator 15, in such another example.

The lithium secondary battery of the disclosure may be a lithium secondary battery obtained by charging and discharging a lithium secondary battery (lithium secondary battery before charge and discharge) including a negative electrode, a positive electrode, and the non-aqueous electrolytic solution of the disclosure.

That is, the lithium secondary battery of the disclosure may be a lithium secondary battery (lithium secondary battery charged and discharged) produced by first producing a lithium secondary battery before charge and discharge, including a negative electrode, a positive electrode, and the non-aqueous electrolytic solution of the disclosure, and thereafter charging and discharging the lithium secondary battery before charge and discharge, one or more times.

The application of the lithium secondary battery of the disclosure is not particularly limited, and can be used in various known applications. The lithium secondary battery can be widely utilized in, for example, applications of small mobile equipment and large equipment, for example, a laptop, a mobile personal computer, a mobile phone, a headset stereo, a video movie, a liquid crystal television, a handy cleaner, an electronic diary, a calculator, a radio, a backup power source, a motor, an automobile, an electric automobile, a motorcycle, an electric motorcycle, a bicycle, an electric bicycle, a lighting device, a game machine, a watch, an electric tool, and a camera.

EXAMPLES

Hereinafter, Examples of the disclosure will be described, but the disclosure is not limited to the following Examples.

In the following Examples and Comparative Examples, "% by weight" represents "% by mass".

In the following Examples and Comparative Examples, "amount added" represents any content in a non-aqueous electrolytic solution finally obtained (namely, the amount with respect to the total amount of the non-aqueous electrolytic solution finally obtained).

[Example 1] Synthesis of Complex Compound (2) (n=5)

After a 50-mL flask equipped with a stirring apparatus, a thermometer, a gas introduction line, and an evacuation line was purged with a dry nitrogen gas, 1.26 g (0.01 mol) of trimethyl boroxine (raw material of the compound A) and 13.21 g (0.15 mol) of 1,3-dioxolan-2-one (compound B) were placed therein and then stirred at room temperature, and thus the trimethyl boroxine was dissolved. Lithium difluorophosphate (raw material of the compound A) (1.62 g) (0.015 mol) and then 2.28 g (0.015 mol) of lithium hexafluorophosphate (raw material of the compound A) were added to the resulting solution. The resulting solution was heated to 40° C. and stirred at 40° C. for 6 hours, whereby a reaction was performed.

A product, 18.37 g of a colorless and clear liquid, was obtained as described above. In other words, the reaction progressed in a state where the mass of each raw material was conserved, and thus the product was obtained.

The resulting product was dissolved in a deuterodimethyl sulfoxide solvent, and subjected to $^1$H-NMR analysis, $^{19}$F-NMR analysis, and $^{11}$B-NMR analysis.

The respective chemical shifts [ppm] and integration values (ratios) in spectra obtained by $^1$H-NMR analysis and $^{19}$F-NMR were as follows.

The chemical shift [ppm] in a spectrum obtained by $^{11}$B-NMR analysis was as follows.

$^1$H-NMR: −0.4 ppm (3H), 4.5 ppm (20H).
$^{19}$F-NMR: −82 ppm (1F), −85 ppm (1F), −139 ppm (2F).
$^{11}$B-NMR: 6.0 ppm.

A pattern where a spectrum pattern derived from a methylborane backbone and a spectrum pattern derived from single 1,3-dioxolan-2-one were combined was confirmed from $^1$H-NMR.

A pattern where a spectrum pattern derived from a difluorophosphoric acid backbone and a spectrum pattern derived from a fluoroborane backbone were combined was confirmed from $^{19}$F-NMR.

A spectrum pattern derived from a methyl-difluoroborane backbone was confirmed from $^{11}$B-NMR.

The resulting product was subjected to differential scanning calorimetry (DSC) measurement from room temperature to 600° C.

As a result, an endothermic thermal dissociation behavior of a peak at 134° C. was observed in the resulting product, such a behavior being not observed in each single measurement of the compound A and the compound B.

All the melting point (165° C.) of the lithium hexafluorophosphate, the boiling point (80° C.) of the trimethyl boroxine, and the boiling point (260° C.) of the 1,3-dioxolan-2-one were not observed in such DSC measurement. Accordingly, it was confirmed that all such compounds were not present singly.

The endothermic thermal dissociation behavior was observed with a differential scanning calorimeter (DSC220 C Model) manufactured by Seiko Instruments Inc.

As described above, the synthesis of Example 1 consequently provided the product, where the reaction progressed in a state where the mass was conserved.

The conversion and consumption of the raw materials of the compound A, the production of a PF$_2$ structure and a BF$_2$ structure in the compound A, and the change in state of the compound B were confirmed from such $^1$H-NMR analysis, $^{19}$F-NMR analysis, $^{11}$B-NMR analysis, and DSC measurement.

Accordingly, it was confirmed that Example 1 consequently provided a complex compound (2) (n=5) made of the compound A and the compound B, as the product, according to the following reaction scheme.

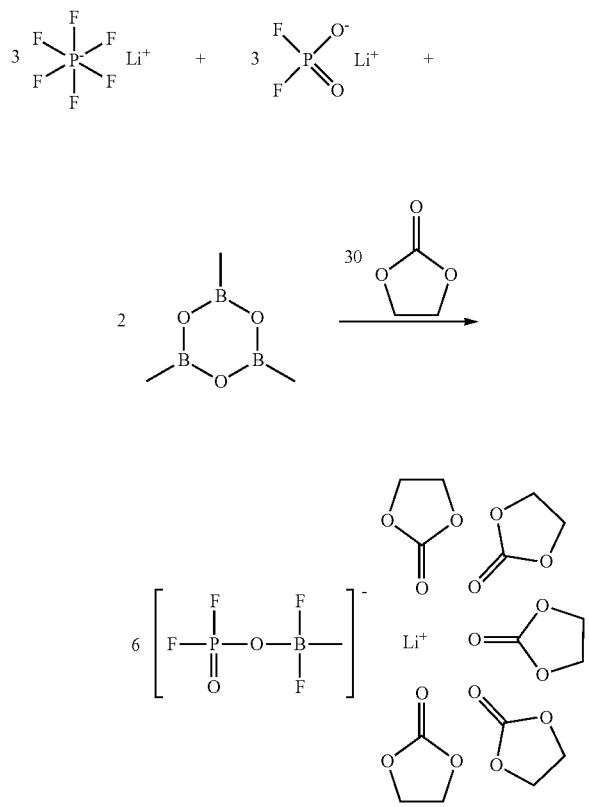

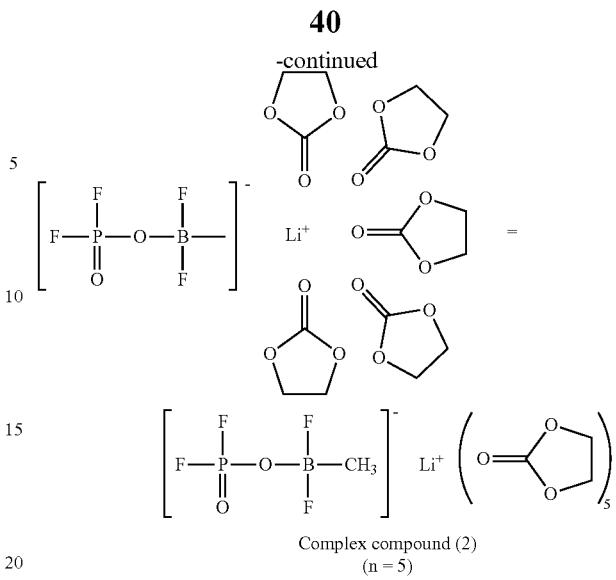

Complex compound (2)
(n = 5)

[Example 2] Synthesis of Complex Compound (16) (n=5)

After a 50-mL flask equipped with a stirring apparatus, a thermometer, a gas introduction line, and an evacuation line was purged with a dry nitrogen gas, 2.41 g (0.01 mol) of a trivinyl boroxine-pyridine complex (raw material of the compound A) and 11.07 g (0.14 mol) of pyridine (compound B) were placed therein and then stirred at room temperature, and thus a solution of trivinyl boroxine was obtained. Lithium difluorophosphate (raw material of the compound A) (1.62 g) (0.015 mol) and then 2.28 g (0.015 mol) of lithium hexafluorophosphate (raw material of the compound A) were added to the resulting solution. The resulting solution was heated to 40° C. and stirred at 40° C. for 6 hours, whereby a reaction was performed.

A product, 17.38 g of a solid, was obtained as described above. In other words, the reaction progressed in a state where the mass of each raw material was conserved, and thus the product was obtained.

The resulting product was dissolved in a deuterodimethyl sulfoxide solvent, and subjected to $^1$H-NMR analysis, $^{19}$F-NMR analysis, and $^{11}$B-NMR analysis.

The respective chemical shifts [ppm] and integration values (ratios) in spectra obtained by $^1$H-NMR analysis and $^{19}$F-NMR were as follows.

The chemical shift [ppm] in a spectrum obtained by $^{11}$B-NMR analysis was as follows.

$^1$H-NMR: 5.7 ppm (1H), 5.85 ppm (1H), 5.90 ppm (1H), 7.4 ppm (10H), 7.8 ppm (5H), 8.6 ppm (10H).

$^{19}$F-NMR: −82 ppm (1F), −85 ppm (1F), −140 ppm (2F).

$^{11}$B-NMR: −1.0 ppm.

A pattern where a spectrum pattern derived from a vinylborane backbone and a spectrum pattern derived from single pyridine were combined was confirmed from $^1$H-NMR.

A pattern where a spectrum pattern derived from a difluorophosphoric acid backbone and a spectrum pattern derived from a fluoroborane backbone were combined was confirmed from $^{19}$F-NMR.

A spectrum pattern derived from a vinyl-difluoroborane backbone was confirmed from $^{11}$B-NMR.

The resulting product was subjected to differential scanning calorimetry (DSC) measurement from room temperature to 600° C. As a result, an endothermic thermal dissociation behavior of a peak at 126° C. was observed in the resulting product, such a behavior being not observed in each single measurement of the compound A and the compound B.

All the melting point (165° C.) of the lithium hexafluorophosphate, the melting point (51° C.) of the trivinyl boroxine-pyridine complex, and the boiling point (115° C.) of the pyridine were not observed in such DSC measurement. Accordingly, it was confirmed that all such compounds were not present singly.

As described above, the synthesis of Example 2 consequently provided the product, where the reaction progressed in a state where the mass was conserved.

The conversion and consumption of the raw materials of the compound A, the production of a PF$_2$ structure and a BF$_2$ structure in the compound A, and the change in state of the compound B were confirmed from such $^1$H-NMR analysis, $^{19}$F-NMR analysis, $^{11}$B-NMR analysis, and DSC measurement.

Accordingly, it was confirmed that Example 2 provided a complex compound (16) (n=5) made of the compound A and the compound B, as the product, according to the following reaction scheme.

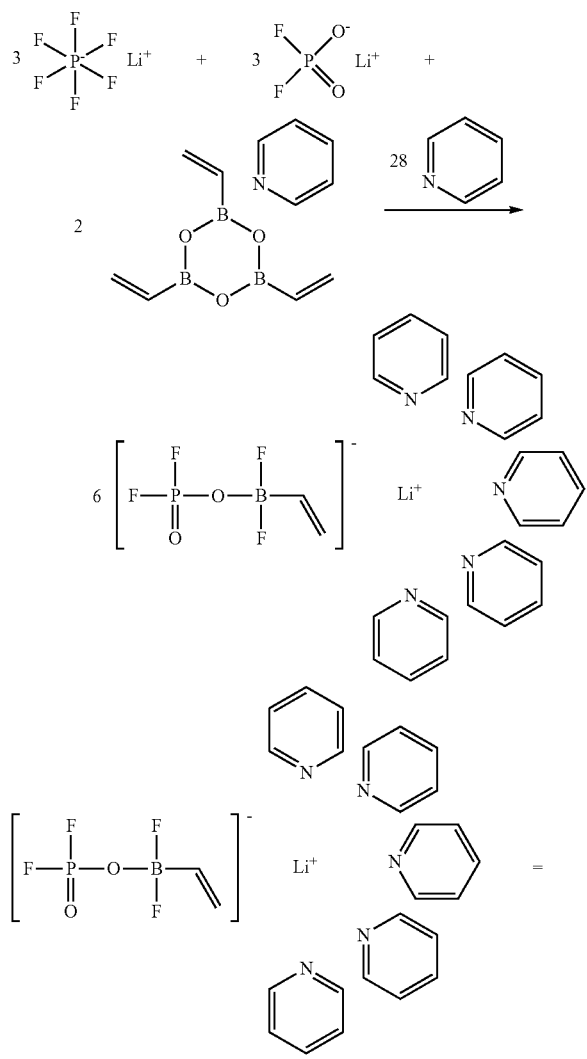

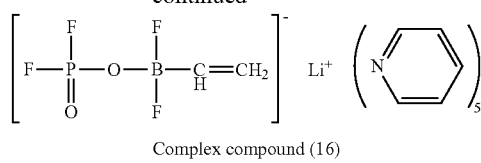

Complex compound (16)
(n = 5)

[Example 3] Synthesis of Complex Compound (18) (n=5)

After a 100-mL flask equipped with a stirring apparatus, a thermometer, a gas introduction line, and an evacuation line was purged with a dry nitrogen gas, 3.12 g (0.01 mol) of triphenyl boroxine (raw material of the compound A), 13.21 g (0.15 mol) of 1,3-dioxolan-2-one (compound B), and 50 g of dimethyl carbonate were placed therein and then stirred at room temperature, and thus the triphenyl boroxine was dissolved. Lithium difluorophosphate (raw material of the compound A) (1.62 g) (0.015 mol) and then 2.28 g (0.015 mol) of lithium hexafluorophosphate (raw material of the compound A) were added to the resulting solution. The resulting solution was heated to 40° C. and stirred at 40° C. for 6 hours, whereby a reaction was performed. Next, the inside of the flask was under a reduced pressure of 10 kPa or less with the solution being stirred, and thereafter warmed to 60° C., thereby allowing the dimethyl carbonate to be distilled off from the solution. The resulting solid was further dried at 60° C. under a reduced pressure of 10 kPa or less.

A product, 20.23 g of a solid, was obtained as described above. In other words, the reaction progressed in a state where the mass of each raw material was conserved, and thus the product was obtained.

The resulting product was dissolved in a deuterodimethyl sulfoxide solvent, and subjected to $^1$H-NMR analysis, $^{19}$F-NMR analysis, and $^{11}$B-NMR analysis.

The respective chemical shifts [ppm] and integration values (ratios) in spectra obtained by $^1$H-NMR analysis and $^{19}$F-NMR were as follows.

The chemical shift [ppm] in a spectrum obtained by $^{11}$B-NMR analysis was as follows.

$^1$H-NMR: 4.5 ppm (20H), 7.3 to 7.9 ppm (5H).
$^{19}$F-NMR: −82 ppm (1F), −85 ppm (1F), −148 ppm (2F).
$^{11}$B-NMR: −2.3 ppm.

A pattern where a spectrum pattern derived from a phenylborane backbone and a spectrum pattern derived from single 1,3-dioxolan-2-one were combined was confirmed from $^1$H-NMR.

A pattern where a spectrum pattern derived from a difluorophosphoric acid backbone and a spectrum pattern derived from a fluoroborane backbone were combined was confirmed from $^{19}$F-NMR.

A spectrum pattern derived from a phenyl-difluoroborane backbone was confirmed from $^{11}$B-NMR.

The resulting product was subjected to differential scanning calorimetry (DSC) measurement from room temperature to 600° C. As a result, an endothermic thermal dissociation behavior of a peak at 247° C. was observed in the resulting product, such a behavior being not observed in each single measurement of the compound A and the compound B.

All the melting point (165° C.) of the lithium hexafluorophosphate, the melting point (217° C.) of the triphenyl boroxine, and the boiling point (260° C.) of the 1,3-dioxolan-2-one were not observed in such DSC measurement. Accordingly, it was confirmed that all such compounds were not present singly.

As described above, the synthesis of Example 3 consequently provided the product, where the reaction progressed in a state where the mass was conserved.

The conversion and consumption of the raw materials of the compound A, the production of a $PF_2$ structure and a $BF_2$ structure in the compound A, and the change in state of the compound B were confirmed from such $^1$H-NMR analysis, $^{19}$F-NMR analysis, $^{11}$B-NMR analysis, and DSC measurement.

Accordingly, it was confirmed that Example 3 provided a complex compound (18) (n=5) made of the compound A and the compound B, as the product, according to the following reaction scheme.

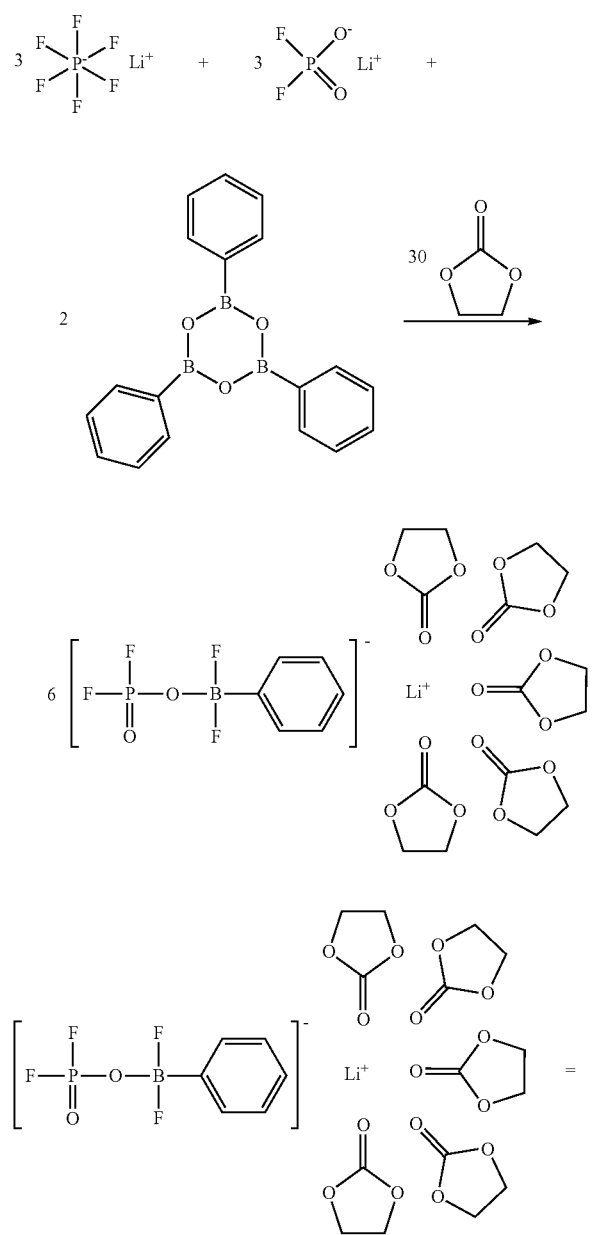

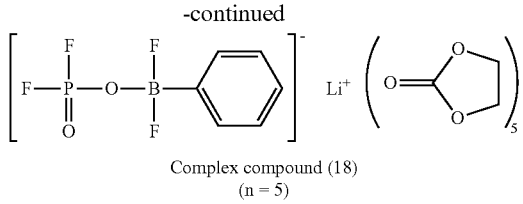

Complex compound (18)
(n = 5)

As described above, an endothermic thermal dissociation behavior not observed in both the compound A and the compound B was observed in the complex compound obtained in each of Examples. In other words, it was confirmed that the complex compound obtained in each of Examples was not a simple mixture of the compound A and the compound B, but a novel lithium boron fluorophosphate complex compound different in thermal properties from both the compound A and the compound B.

Example 101

A coin-type battery being a lithium secondary battery was produced according to the following procedure.

<Production of Negative Electrode>

A paste-like negative electrode mixture slurry was prepared by kneading 100 parts by mass of natural graphite-based graphite, 1 part by mass of carboxymethyl cellulose, and 2 parts by mass of SBR latex, with a water solvent.

Next, a band-shaped negative electrode current collector made of copper foil, having a thickness of 18 m, was coated with the negative electrode mixture slurry, and the resultant was dried and thereafter pressed by roll pressing, thereby providing a sheet-shaped negative electrode including the negative electrode current collector and a negative electrode active material layer. The negative electrode active material layer here had a coating density of 12 mg/cm$^2$ and a packing density of 1.5 g/mL.

<Production of Positive Electrode>

A paste-like positive electrode mixture slurry was prepared by kneading 90 parts by mass of $LiNi_{0.5}Mn_{0.3}Co_{0.2}O_2$, 5 parts by mass of acetylene black, and 5 parts by mass of polyvinylidene fluoride, with N-methylpyrrolidone as a solvent.

Next, a band-shaped positive electrode current collector of aluminum foil, having a thickness of 20 μm, was coated with the positive electrode mixture slurry, and the resultant was dried and thereafter pressed by roll pressing, thereby providing a sheet-shaped positive electrode including the positive electrode current collector and a positive electrode active material. A positive electrode active material layer here had a coating density of 22 mg/cm$^2$ and a packing density of 2.9 g/mL.

<Preparation of Non-Aqueous Electrolytic Solution>

A mixed solvent was obtained by mixing ethylene carbonate (EC), dimethyl carbonate (DMC), and methylethyl carbonate (EMC) as non-aqueous solvents.

$LiPF_6$ as an electrolyte was dissolved in the resulting mixed solvent so that the concentration of the electrolyte in a non-aqueous electrolytic solution to be finally obtained was 1 mol/L.

A mixture of the complex compound (2) (n=5) (hereinafter, simply referred to as "complex compound (2)") (additive) and DMC was added to the resulting solution, thereby providing a non-aqueous electrolytic solution. The amount of the complex compound (2) added (namely, the content with respect to the total amount of the final non-aqueous electrolytic solution) was here set to 0.2% by mass.

The mass ratio among EC, DMC, and EMC in the final non-aqueous electrolytic solution was adjusted so that EC:DMC:EMC=30:35:35 (mass ratio) was satisfied.

<Production of Coin-Type Battery>

The negative electrode and the positive electrode were subjected to punching so as to each have a disk shape having a diameter of 14.5 mm and a diameter of 13 mm, thereby providing each coin-shaped electrode (negative electrode and positive electrode). A microporous polyethylene film having a thickness of 20 μm was subjected to punching so as to have a disk shape having diameter of 16 mm, thereby providing a separator.

The resulting coin-shaped negative electrode, separator, and coin-shaped positive electrode were layered in the listed order in a stainless battery can (2032 size), and 40 μL of the non-aqueous electrolytic solution was injected to thereby impregnate the separator, the positive electrode, and the negative electrode therewith.

An aluminum plate (having a thickness of 1.2 mm and a diameter of 16 mm) and a spring were placed on the positive electrode, and a battery can lid was swaged via a polypropylene gasket to thereby hermetically enclose a battery, whereby a coin-type battery having a configuration illustrated in FIG. 3, having a diameter of 20 mm and a height of 3.2 mm, was produced.

<Evaluation of Coin-Type Battery>

The resulting coin-type battery was evaluated as follows, with an ASKA charge/discharge apparatus (ASKA CHARGE DISCHARGE SYSTEM ACD-M01A, ASKA Electronic Co., Ltd., Japan) and a constant-temperature bath (LU-113, ESPEC CORP., Japan).

(Conditioning)

The coin-type battery was subjected repeatedly four times to an operation where CC-CV charge to 4.2 V was conducted at a charge rate of 0.2 C and then CC discharge was conducted at a discharge rate of 0.2 C at 25° C. in a constant-temperature bath.

(Initial Battery Resistance)

The coin-type battery after conditioning was used to measure the initial battery resistance at 25° C. according to the following method.

First, CC 10s discharge was conducted from 50% of SOC (abbreviation of "State of Charge") at a discharge rate of 0.2 C, and CC-CV 10s charge was conducted at a charge rate of 0.2 C.

Next, CC 10s discharge was conducted at a discharge rate of 1 C and CC-CV 10s charge was conducted at a charge rate of 1 C.

Next, CC 10s discharge was conducted at a discharge rate of 2 C and CC-CV 10s charge was conducted at a charge rate of 2 C.

Next, CC 10s discharge was conducted at a discharge rate of 5 C and CC-CV 10s charge was conducted at a charge rate of 5 C.

The CC 10s discharge means discharge at a constant current (Constant Current) for 10 seconds. The CC-CV 10s charge means charge at a constant current and a constant voltage (Constant Current-Constant Voltage) for 10 seconds.

A direct-current resistance was determined from each charge/discharge pause current and each charge/discharge pause voltage, and the resulting direct-current resistance was defined as the initial battery resistance of the coin-type battery.

The initial battery resistance of a coin-type battery of Comparative Example 101 described below was also determined in the same manner.

The initial battery resistance (relative value) of the coin-type battery of Example 101 was determined as a relative value under assumption that the initial battery resistance of the coin-type battery of Comparative Example 101 was defined as 100.

The results are shown in Table 1.

(Battery Resistance after Low-Temperature Cycle)

—Low-Temperature Cycle Test—

A low-temperature cycle test was performed with respect to the coin-type battery after conditioning.

The low-temperature cycle test here was an operation for performing, 50 times, a cycle where the coin-type battery was charged at a charge rate of 0.2 C and discharged at a discharge rate of 0.5 C at −10° C.

—Measurement of Battery Resistance—

The battery resistance after the low-temperature cycle was measured with the coin-type battery after the low-temperature cycle test, according to the same method as in the initial direct-current resistance.

The battery resistance after the low-temperature cycle of the coin-type battery of Comparative Example 101 described below was also measured in the same manner.

The battery resistance (relative value) after the low-temperature cycle of the coin-type battery of Example 101 was determined as a relative value under the assumption that the battery resistance after the low-temperature cycle of the coin-type battery of Comparative Example 101 was defined as 100.

The results are shown in Table 1.

(Initial Discharge Capacity (0.2 C))

The coin-type battery after conditioning was charged to 100% of SOC at a charge rate of 0.2 C, and thereafter the initial discharge capacity (0.2 C) was measured at a discharge rate of 0.2 C at 25° C.

The initial discharge capacity (0.2 C) of the coin-type battery of Comparative Example 101 described below was also measured in the same manner.

The initial discharge capacity (0.2 C) (relative value) of the coin-type battery of Example 101 was determined as a relative value under the assumption that the initial discharge capacity (0.2 C) of the coin-type battery of Comparative Example 101 was defined as 100.

The results are shown in Table 1.

(Initial Discharge Capacity Retention Rate (0.2 C-2 C))

The initial discharge capacity (2 C) was measured in the same manner as in the initial discharge capacity (0.2 C) except that the discharge rate was changed from 0.2 C to 2 C.

The initial discharge capacity retention rate (0.2 C-2 C) was determined based on the following expression.

Initial discharge capacity retention rate (0.2 C-2 C)= (Initial discharge capacity (2 C))/(Initial discharge capacity (0.2 C))

The initial discharge capacity retention rate (0.2 C-2 C) of the coin-type battery of Comparative Example 101 described below was also measured in the same manner.

The initial discharge capacity retention rate (0.2 C-2 C) (relative value) of the coin-type battery of Example 101 was determined as a relative value under the assumption that the initial discharge capacity retention rate (0.2 C-2 C) of the coin-type battery of Comparative Example 101 was defined as 100.

The results are shown in Table 1.

(Discharge Capacity (0.2 C) after Low-Temperature Cycle)

The coin-type battery after conditioning was subjected to the low-temperature cycle test.

The discharge capacity (0.2 C) after the low-temperature cycle was measured with the coin-type battery after the low-temperature cycle test, according to the same method as in the initial discharge capacity (0.2 C).

The discharge capacity (0.2 C) after the low-temperature cycle of the coin-type battery of Comparative Example 101 described below was also measured in the same manner.

The discharge capacity (0.2 C) (relative value) after the low-temperature cycle of the coin-type battery of Example 101 was determined as a relative value under the assumption that the discharge capacity (0.2 C) after the low-temperature cycle of the coin-type battery of Comparative Example 101 was defined as 100.

Examples 102 and 103

The same operation as in Example 101 was performed except that the amount of the complex compound (2) added was changed to 0.4% by mass (Example 102) or 0.6% by mass (Example 103).

The results are shown in Table 1.

Comparative Example 101

The same operation as in Example 101 was performed except that no complex compound (2) was added.

The results are shown in Table 1.

TABLE 1

| | Additive of non-aqueous electrolytic solution | | Battery resistance | | Initial discharge capacity (0.2 C) (relative value) | Discharge capacity retention rate (0.2 C-2 C) (relative value) | Discharge capacity after low-temperature cycle (0.2 C) (relative value) | Discharge capacity retention rate after low-temperature cycle (0.2 C-2 C) (relative value) |
|---|---|---|---|---|---|---|---|---|
| | Type | Amount added (% by weight) | Initial (relative value) | After low-temperature cycle (relative value) | | | | |
| Comparative Example 101 | None | — | 100 | 100 | 100 | 100 | 100 | 100 |
| Example 101 | Complex compound (2) | 0.2 | 97 | 91 | 102 | 100 | 103 | 100 |
| Example 102 | Complex compound (2) | 0.4 | 90 | 88 | 102 | 102 | 103 | 101 |
| Example 103 | Complex compound (2) | 0.6 | 86 | 85 | 104 | 105 | 107 | 103 |

Evaluation results of coin-type battery

The results are shown in Table 1.

(Discharge Capacity Retention Rate (0.2 C-2 C) after Low-Temperature Cycle)

The discharge capacity (2 C) after the low-temperature cycle was measured in the same manner as in the discharge capacity (0.2 C) after the low-temperature cycle except that the discharge rate was changed from 0.2 C to 2 C.

The discharge capacity retention rate (0.2 C-2 C) after the low-temperature cycle was determined based on the following expression.

Discharge capacity retention rate (0.2 C-2 C) after low-temperature cycle=(Discharge capacity (2 C) after low-temperature cycle)/(Discharge capacity (0.2 C) after low-temperature cycle)

The discharge capacity retention rate (0.2 C-2 C) after the low-temperature cycle of the coin-type battery of Comparative Example 101 described below was also measured in the same manner.

The discharge capacity retention rate (0.2 C-2 C) (relative value) after the low-temperature cycle of the coin-type battery of Example 101 was determined as a relative value under the assumption that the discharge capacity retention rate (0.2 C-2 C) after the low-temperature cycle of the coin-type battery of Comparative Example 101 was defined as 100.

The results are shown in Table 1.

As represented in Table 1, the coin-type batteries of Examples 101 to 103 were reduced in each battery resistance (in detail, the initial battery resistance, and the battery resistance after the low-temperature cycle), as compared with the coin-type battery of Comparative Example 101.

The coin-type batteries of Examples 101 to 103 were also excellent in each battery discharge capacity (in detail, the initial discharge capacity, the initial discharge capacity retention rate, the discharge capacity after the low-temperature cycle, and the discharge capacity retention rate after the low-temperature cycle), as compared with the coin-type battery of Comparative Example 101.

Comparative Examples 102 to 104

Respective coin-type batteries of Comparative Examples 102 to 104 were produced in the same manner as in Examples 101 to 103 except that the type of the additive of the non-aqueous electrolytic solution was changed from the complex compound (2) to $LiBF_3(PO_2F_2)$. The respective amounts of the additives added, in Comparative Examples 102 to 104, were the same as the amounts of the additives added, in Examples 101 to 103.

The resulting coin-type batteries were subjected to the conditioning described in Example 101. The coin-type batteries subjected to the conditioning were each charged to 100% of SOC at a charge rate of 0.2 C, and stored in a constant-temperature bath at 55° C. for 5 days (high-temperature storage).

Each of the coin-type batteries after the high-temperature storage was subjected to respective measurements of the discharge capacity (0.2 C) after the high-temperature storage and the discharge capacity retention rate (0.2 C-2 C) after the high-temperature storage, according to the same methods as in the initial discharge capacity (0.2 C) and the initial discharge capacity retention rate (0.2 C-2 C) in Example 101.

Each of the coin-type batteries of Examples 101 to 103 and Comparative Example 101 was also similarly subjected to such measurements of the discharge capacity (0.2 C) after the high-temperature storage and the discharge capacity retention rate (0.2 C-2 C) after the high-temperature storage.

The discharge capacity (0.2 C) (relative value) after the high-temperature storage of each of the coin-type batteries of Examples 101 to 103 and Comparative Examples 102 to 104 was determined as a relative value under the assumption that the discharge capacity (0.2 C) after the high-temperature storage of the coin-type battery of Comparative Example 101 was defined as 100.

Similarly, the discharge capacity retention rate (0.2 C-2 C) (relative value) after the high-temperature storage of each of the coin-type batteries of Examples 101 to 103 and Comparative Examples 102 to 104 was determined as a relative value under the assumption that the discharge capacity retention rate (0.2 C-2 C) after the high-temperature storage of the coin-type battery of Comparative Example 101 was defined as 100.

The foregoing results are shown in Table 2.

TABLE 2

| | Additive of non-aqueous electrolytic solution | | Evaluation results of coin-type battery | |
|---|---|---|---|---|
| | | | Discharge capacity after high-temperature storage (0.2 C.) (relative value) | Discharge capacity retention rate after high-temperature storage (0.2 C.-2 C.) (relative value) |
| | Type | Amount added by (% weight) | | |
| Comparative Example 101 | None | — | 100 | 100 |
| Comparative Example 102 | $LiBF_3(PO_2F_2)$ | 0.2 | 94 | 98 |
| Comparative Example 103 | $LiBF_3(PO_2F_2)$ | 0.4 | 98 | 100 |
| Comparative Example 104 | $LiBF_3(PO_2F_2)$ | 0.6 | 97 | 98 |
| Example 101 | Complex compound (2) | 0.2 | 99 | 100 |
| Example 102 | Complex compound (2) | 0.4 | 104 | 102 |
| Example 103 | Complex compound (2) | 0.6 | 100 | 101 |

As represented in Table 2, the coin-type batteries of Examples 101 to 103 each had a discharge capacity after the high-temperature storage and a discharge capacity retention rate after the high-temperature storage, which were kept high, as compared with the coin-type batteries of Comparative Examples 102 to 103.

Examples 201 to 203 and Comparative Example 201

Respective coin-type batteries were produced in the same manner as in Examples 101 to 103 and Comparative Example 101 except that vinylene carbonate (VC) (in an amount added of 2.0% by weight) was further contained in the non-aqueous electrolytic solution.

The initial battery resistance, the battery resistance after the low-temperature cycle, and the discharge capacity retention rate after the low-temperature cycle (0.2 C-2 C) of each of the respective coin-type batteries were determined in the same manner as in Examples 101 to 103 and Comparative Example 101. The results were each determined as a relative value under the assumption that the results in Comparative Example 201 were each defined as 100.

Hereinafter, the lithium boron fluorophosphate complex compound contained in the non-aqueous electrolytic solution is referred to as "additive A" and the vinylene carbonate (VC) contained in the non-aqueous electrolytic solution is referred to as "additive B".

The results are shown in Table 3.

TABLE 3

| | Additive A of non-aqueous electrolytic solution | | Additive B of non-aqueous electrolytic solution | | Evaluation results of coin-type battery | | |
|---|---|---|---|---|---|---|---|
| | | | | | Battery resistance | | Discharge capacity |
| | Type | Amount added (% by weight) | Type | Amount added (% by weight) | Initial (relative value) | After low-temperature cycle (relative value) | retention rate after low-temperature cycle (0.2 C-2 C) (relative value) |
| Comparative Example 201 | None | — | VC | 2.0 | 100 | 100 | 100 |
| Example 201 | Complex compound (2) | 0.2 | VC | 2.0 | 87 | 84 | 100 |
| Example 202 | Complex compound (2) | 0.4 | VC | 2.0 | 95 | 89 | 101 |

TABLE 3-continued

|  | Additive A of non-aqueous electrolytic solution | | Additive B of non-aqueous electrolytic solution | | Evaluation results of coin-type battery | | |
| --- | --- | --- | --- | --- | --- | --- | --- |
|  | | | | | Battery resistance | | Discharge capacity |
|  | | | | | Initial (relative value) | After low-temperature cycle (relative value) | retention rate after low-temperature cycle (0.2 C-2 C) (relative value) |
|  | Type | Amount added (% by weight) | Type | Amount added (% by weight) | | | |
| Example 203 | Complex compound (2) | 0.6 | VC | 2.0 | 99 | 99 | 104 |

As represented in Table 3, the coin-type batteries of Examples 201 to 203 were reduced in each battery resistance (in detail, the initial battery resistance, and the battery resistance after the low-temperature cycle), as compared with the coin-type battery of Comparative Example 201.

The coin-type batteries of Examples 201 to 203 were also excellent in each battery discharge capacity (in detail, discharge capacity retention rate after low-temperature cycle), as compared with the coin-type battery of Comparative Example 201.

Example 301

A laminate-type battery being a lithium secondary battery was produced according to the following procedure.

<Production of Negative Electrode>

A sheet-shaped negative electrode was produced in the same manner as in production of the negative electrode in Example 101.

Next, one negative electrode plate was cut out from the sheet-shaped negative electrode, and a negative electrode tab was attached to the negative electrode plate.

<Production of Positive Electrode>

A sheet-shaped positive electrode was produced in the same manner as in production of the positive electrode in Example 101.

Next, one positive electrode plate was cut out from the sheet-shaped positive electrode, and a positive electrode tab was attached to the positive electrode plate.

<Preparation of Non-Aqueous Electrolytic Solution>

A non-aqueous electrolytic solution was prepared in the same manner as in preparation of the non-aqueous electrolytic solution in Example 101.

<Attachment of Positive Electrode Terminal and Negative Electrode Terminal>

One negative electrode tab extending from one negative electrode plate was attached to one negative electrode terminal made of copper foil, according to ultrasonic welding.

One positive electrode tab extending from one positive electrode plate was attached to one positive electrode terminal made of aluminum foil, according to ultrasonic welding.

Next, the negative electrode plate to which the negative electrode terminal was attached and the positive electrode plate to which the positive electrode terminal was attached were layered with a separator (microporous polyethylene film having a thickness of 20 μm) being interposed therebetween, thereby providing a laminated body.

<Production of Laminate-Type Battery>

Such a layered electrode body was accommodated in an aluminum laminate outer package, and one side of the laminate outer package, where the positive electrode terminal and the negative electrode terminal were disposed, was heat-sealed. The heat-sealing was made so that one portion of the positive electrode terminal and one portion of the negative electrode terminal were protruded from the peripheral end portion of the laminate outer package. The portions, from which the positive electrode terminal and the negative electrode terminal were protruded, were each sealed by an insulation seal.

Next, two sides of the remaining three sides of the laminate outer package were heat-sealed.

Next, the non-aqueous electrolytic solution was injected, from one side of the laminate outer package, not heat-sealed, into the laminate outer package, and the positive electrode plate, the negative electrode plate, and the separator were impregnated with the non-aqueous electrolytic solution. Next, such one side not heat-sealed was heat-sealed, thereby allowing the laminate outer package to be hermetically sealed.

As described above, a laminate-type battery was obtained.

<Evaluation of Laminate-Type Battery>

The resulting laminate-type batteries were subjected to respective measurements of the initial battery resistance and the initial discharge capacity (0.2 C), according to the same methods as in evaluation of the laminate-type battery (in detail, the initial battery resistance and the initial discharge capacity (0.2 C)) in Example 101.

The battery resistance after the high-temperature cycle, the discharge capacity (0.2 C) after the high-temperature cycle, and the discharge capacity retention rate (0.2 C-2 C) after the high-temperature cycle of each of the resulting laminate-type batteries were determined in the same manner as in evaluation of each laminate-type battery (in detail, the battery resistance after the low-temperature cycle, the discharge capacity after the low-temperature cycle (0.2 C), and the discharge capacity retention rate after the low-temperature cycle (0.2 C-2 C)) in Example 101 except that the low-temperature cycle test was changed to the high-temperature cycle test.

The high-temperature cycle test was here an operation for performing, 150 times, a cycle where the coin-type battery was charged at a charge rate of 1 C and discharged at a discharge rate of 1 C at 55° C.

A laminate-type battery of Comparative Example 301, described below, was also evaluated in the same manner as in the above evaluation.

Each evaluation result in Example 301 was determined as a relative value under the assumption that each evaluation result in Comparative Example 301 was defined as 100.

The foregoing results are shown in Table 4.

Example 302

The same operation as in Example 301 was performed except that the amount of the complex compound (2) added was changed to 0.4% by mass.

The results are shown in Table 4.

Comparative Example 301

The same operation as in Example 301 was performed except that no complex compound (2) was added.
The results are shown in Table 4.

TABLE 4

| | Additive of non-aqueous electrolytic solution | | Evaluation results of laminate-type battery | | | | |
| --- | --- | --- | --- | --- | --- | --- | --- |
| | | | Battery resistance | | Initial discharge capacity (0.2 C) (relative value) | Discharge capacity after high-temperature cycle (0.2 C) (relative value) | Discharge capacity retention rate after high-temperature cycle (0.2 C-2 C) (relative value) |
| | Type | Amount added (% by weight) | Initial (relative value) | After high-temperature cycle (relative value) | | | |
| Comparative Example 301 | None | — | 100 | 100 | 100 | 100 | 100 |
| Example 301 | Complex compound (2) | 0.2 | 97 | 63 | 101 | 113 | 112 |
| Example 302 | Complex compound (2) | 0.4 | 95 | 78 | 102 | 101 | 101 |

As represented in Table 4, the laminate-type batteries of Examples 301 and 302 were reduced in each battery resistance (in detail, the initial battery resistance and the battery resistance after the high-temperature cycle), as compared with the laminate-type battery of Comparative Example 301.

The laminate-type batteries of Examples 301 and 302 were also excellent in each battery discharge capacity (in detail, the initial discharge capacity, the discharge capacity after the high-temperature cycle, and the discharge capacity retention rate after the high-temperature cycle), as compared with the laminate-type battery of Comparative Example 301.

Example 401

The same operation as in Example 101 was performed except that the complex compound (2) (an amount added of 0.2% by mass) used for preparation of the non-aqueous electrolytic solution was changed to the complex compound (18) (n=5) (hereinafter, simply referred to as "complex compound (18)") (an amount added of 0.4% by mass). In this regard, each result in Example 401 was determined as a relative value under the assumption that the results in Comparative Example 101 (no additive added) were each defined as 100.

The results are shown in Table 5.

Example 402

The same operation as in Example 101 was performed except that the amount of the complex compound (18) added was changed to 0.6% by mass.
The results are shown in Table 5.

TABLE 5

| | Additive of non-aqueous electrolytic solution | | Evaluation results of coin-type battery | | | | | |
| --- | --- | --- | --- | --- | --- | --- | --- | --- |
| | | | Battery resistance | | Initial discharge capacity (0.2 C) (relative value) | Discharge capacity retention rate (0.2 C-2 C) (relative value) | Discharge capacity after low-temperature cycle (0.2 C) (relative value) | Discharge capacity retention rate after low-temperature cycle (0.2 C-2 C) (relative value) |
| | Type | Amount added (% by weight) | Initial (relative value) | After low-temperature cycle (relative value) | | | | |
| Comparative Example 101 | None | — | 100 | 100 | 100 | 100 | 100 | 100 |
| Example 401 | Complex compound (18) | 0.4 | 97 | 98 | 102 | 101 | 102 | 101 |
| Example 402 | Complex compound (18) | 0.6 | 96 | 97 | 103 | 100 | 100 | 102 |

As represented in Table 5, the coin-type batteries of Examples 401 and 402 were reduced in each battery resistance (in detail, the initial battery resistance, and the battery resistance after the low-temperature cycle), as compared with the coin-type battery of Comparative Example 101.

The coin-type batteries of Examples 401 and 402 were also excellent in each battery discharge capacity (in detail, the initial discharge capacity, the initial discharge capacity retention rate, the discharge capacity after the low-temperature cycle, and the discharge capacity retention rate after the low-temperature cycle), as compared with the coin-type battery of Comparative Example 101.

Examples 501 and 502, and Comparative Example 501

Respective coin-type batteries were produced in the same manner as in Examples 401 and 402, and Comparative Example 101 except that vinylene carbonate (VC) (in an amount added of 1.0% by weight) was further contained in the non-aqueous electrolytic solution.

The initial battery resistance, the battery resistance after the low-temperature cycle, and the discharge capacity retention rate after the low-temperature cycle (0.2 C-2 C) of each of the respective coin-type batteries were determined in the same manner as in Examples 401 and 402, and Comparative Example 101. The results were each determined as a relative value under the assumption that the results in Comparative Example 501 were each defined as 100.

The results are shown in Table 6.

TABLE 6

| | Additive A of non-aqueous electrolytic solution | | Additive B of non-aqueous electrolytic solution | | Evaluation results of coin-type battery | | |
|---|---|---|---|---|---|---|---|
| | | | | | Battery resistance | | Discharge capacity |
| | Type | Amount added (% by weight) | Type | Amount added (% by weight) | Initial (relative value) | After low-temperature cycle (relative value) | retention rate after low-temperature cycle (0.2 C-2 C) (relative value) |
| Comparative Example 501 | None | — | VC | 1.0 | 100 | 100 | 100 |
| Example 501 | Complex compound (18) | 0.4 | VC | 1.0 | 98 | 95 | 102 |
| Example 502 | Complex compound (18) | 0.6 | VC | 1.0 | 96 | 97 | 102 |

As represented in Table 6, the coin-type batteries of Examples 501 and 502 were reduced in each battery resistance (in detail, the initial battery resistance, and the battery resistance after the low-temperature cycle), as compared with the coin-type battery of Comparative Example 501.

The coin-type batteries of Examples 501 and 502 were also excellent in each battery discharge capacity (in detail, the discharge capacity retention rate after the low-temperature cycle), as compared with the coin-type battery of Comparative Example 501.

The disclosures of Japanese Patent Application No. 2017-137754, filed Jul. 14, 2017, and Japanese Patent Application No. 2018-015002, filed Jan. 31, 2018, are incorporated herein by reference in their entirety.

All publications, patent applications, and technical standards mentioned in this specification are herein incorporated by reference to the same extent as if each individual publication, patent application, or technical standard was specifically and individually indicated to be incorporated by reference.

The invention claimed is:

1. A lithium boron fluorophosphate complex compound comprising:
    a compound A that is one selected from a group of lithium boron fluorophosphates represented by the following Formula (I); and
    a compound B that is one selected from a group of compounds represented by the following Formulae (II) to (IX):

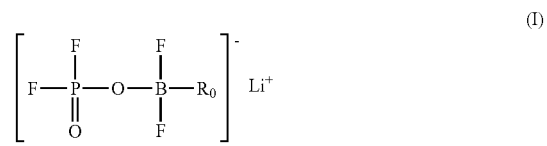

(I)

wherein, in Formula (I), $R_0$ represents an aliphatic hydrocarbon group having from 1 to 12 carbon atoms,

(II)

-continued

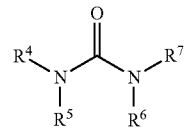

(III)

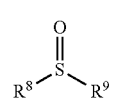

(IV)

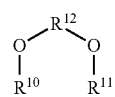

(V)

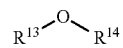

(VI)

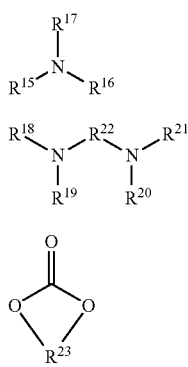

(VII)

(VIII)

(IX)

wherein, in Formula (II), $R^1$ to $R^3$ each independently represent a hydrogen atom, an alkyl group optionally substituted with a halogen atom, an alkoxy group optionally substituted with a halogen atom, an alkenyl group optionally substituted with a halogen atom, an alkynyl group optionally substituted with a halogen atom, or an aryl group; and $R^1$ and $R^3$, or $R^2$ and $R^3$ are optionally combined to represent an alkylene group having from 2 to 9 carbon atoms;

in Formula (III), $R^4$ to $R^7$ each independently represent a hydrogen atom, an alkyl group optionally substituted with a halogen atom, an alkenyl group optionally substituted with a halogen atom, an alkynyl group optionally substituted with a halogen atom, or an aryl group; and $R^4$ and $R^5$, $R^6$ and $R^7$, or $R^5$ and $R^6$ are optionally combined to represent an alkylene group having from 2 to 9 carbon atoms;

in Formula (IV), $R^8$ and $R^9$ each independently represent an alkyl group optionally substituted with a halogen atom, an alkenyl group optionally substituted with a halogen atom, an alkynyl group optionally substituted with a halogen atom, or an aryl group; and $R^8$ and $R^9$ are optionally combined to represent an alkylene group having from 2 to 9 carbon atoms;

in Formula (V), $R^{10}$ and $R^{11}$ each independently represent an alkyl group optionally substituted with a halogen atom, an alkenyl group optionally substituted with a halogen atom, an alkynyl group optionally substituted with a halogen atom, or an aryl group; $R^{10}$ and $R^{11}$ are optionally combined to represent an alkylene group having from 2 to 9 carbon atoms or a sulfonylalkylenesulfonyl group having from 1 to 6 carbon atoms; and $R^{12}$ represents an alkylene group having from 1 to 4 carbon atoms, optionally substituted with at least one substituent selected from the group consisting of a halogen atom, an alkyl group optionally substituted with a halogen atom, an alkenyl group optionally substituted with a halogen atom, and an alkynyl group optionally substituted with a halogen atom;

in Formula (VI), $R^{13}$ and $R^{14}$ each independently represent an alkyl group optionally substituted with a halogen atom, an alkenyl group optionally substituted with a halogen atom, an alkynyl group optionally substituted with a halogen atom, or an aryl group; and $R^{13}$ and $R^{14}$ are optionally combined to represent a divalent aliphatic group having from 2 to 9 carbon atoms;

in Formula (VII), $R^{15}$ to $R^{17}$ each independently represent an alkyl group optionally substituted with a halogen atom, an alkenyl group optionally substituted with a halogen atom, an alkynyl group optionally substituted with a halogen atom, or an aryl group; and $R^{15}$, $R^{16}$ and $R^{17}$ are optionally combined to represent a divalent aliphatic group having from 2 to 9 carbon atoms;

in Formula (VIII), $R^{18}$ to $R^{21}$ each independently represent an alkyl group optionally substituted with a halogen atom, an alkenyl group optionally substituted with a halogen atom, an alkynyl group optionally substituted with a halogen atom, or an aryl group; $R^{18}$ and $R^{21}$ are optionally combined to represent an alkylene group having from 2 to 9 carbon atoms, and $R^{19}$ and $R^{20}$ are optionally combined to represent an alkylene group having from 2 to 9 carbon atoms; and $R^{22}$ represents an alkylene group having from 1 to 4 carbon atoms, optionally substituted with at least one substituent selected from the group consisting of a halogen atom, an alkyl group optionally substituted with a halogen atom, an alkenyl group optionally substituted with a halogen atom, and an alkynyl group optionally substituted with a halogen atom; and in Formula (IX), $R^{23}$ represents an alkylene group having from 2 to 9 carbon atoms, optionally substituted with at least one substituent selected from the group consisting of a halogen atom, an alkyl group optionally substituted with a halogen atom, an alkenyl group optionally substituted with a halogen atom, and an alkynyl group optionally substituted with a halogen atom.

2. The lithium boron fluorophosphate complex compound according to claim 1, wherein:
the compound A is one selected from a group of lithium boron fluorophosphates represented by the following Formula (X), and
the compound B is one selected from the group consisting of N-methylpyrrolidone, 1,3-dimethyl-2-imidazolidinone, dimethoxyethane, 1,3-dioxolane, 1,4-dioxane, dimethyl sulfoxide, 1,5,2,4-dioxadithiane-2,2,4,4-tetraoxide, diethyl ether, furan, tetrahydrofuran, triethylamine, pyridine, triethylenediamine, 1,3-dioxolan-2-one, 4-methyl-1,3-dioxolan-2-one, and 4-fluoro-1,3-dioxolan-2-one:

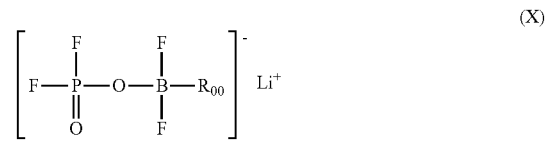

(X)

wherein, in Formula (X), $R_{00}$ represents a methyl group, an ethyl group, a propyl group, an isopropyl group, a n-butyl group, an isobutyl group, a vinyl group, an allyl group, or an ethynyl group.

3. The lithium boron fluorophosphate complex compound according to claim 1, wherein:
the compound A is one selected from the group consisting of lithium boron fluorophosphates represented by the following Formulae (XI) to (XII); and
the compound B is one selected from the group consisting of N-methylpyrrolidone, 1,3-dioxolan-2-one, 4-fluoro-1,3-dioxolan-2-one, diethyl ether, dimethoxyethane, tetrahydrofuran, 1,3-dioxolane, and pyridine:

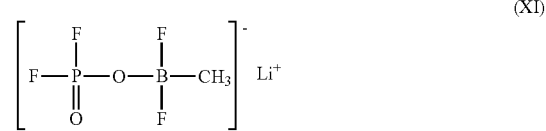

(XI)

-continued

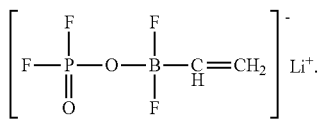
(XII)

4. A lithium boron fluorophosphate complex compound comprising at least one compound A selected from a group of lithium boron fluorophosphates represented by the following Formula (I):

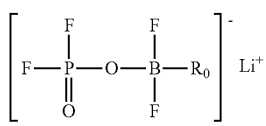
(I)

wherein, in Formula (I), $R_0$ represents an aliphatic hydrocarbon group having from 1 to 12 carbon atoms.

5. A lithium boron fluorophosphate-containing composition comprising at least one compound A selected from a group of lithium boron fluorophosphates represented by the following Formula (I):

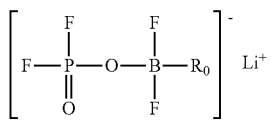
(I)

wherein, in Formula (I), $R_0$ represents an aliphatic hydrocarbon group having from 1 to 12 carbon atoms.

6. A lithium boron fluorophosphate represented by the following Formula (I):

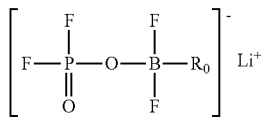
(I)

wherein, in Formula (I), $R_0$ represents an aliphatic hydrocarbon group having from 1 to 12 carbon atoms.

7. An additive for a lithium secondary battery, the additive comprising the lithium boron fluorophosphate complex compound according to claim 1.

8. A non-aqueous electrolytic solution for a battery, the solution comprising the lithium boron fluorophosphate complex compound according to claim 1.

9. The non-aqueous electrolytic solution for a battery according to claim 8, the solution further comprising an additive C that is a compound represented by the following Formula (C):

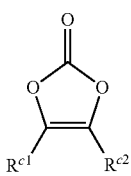
(C)

wherein, in Formula (C), $R^{c1}$ and $R^{c2}$ each independently represent a hydrogen atom, a methyl group, an ethyl group, or a propyl group.

10. A lithium secondary battery comprising:

a positive electrode;

a negative electrode comprising, as a negative electrode active material, at least one selected from the group consisting of metallic lithium, a lithium-containing alloy, a metal or alloy capable of alloying with lithium, an oxide capable of doping and dedoping a lithium ion, a transition metal nitride capable of doping and dedoping a lithium ion, and a carbon material capable of doping and dedoping a lithium ion; and the non-aqueous electrolytic solution for a battery according to claim 8.

11. A lithium secondary battery obtained by charging and discharging the lithium secondary battery according to claim 10.

* * * * *